(12) United States Patent
Kissell

(10) Patent No.: US 7,849,297 B2
(45) Date of Patent: Dec. 7, 2010

(54) SOFTWARE EMULATION OF DIRECTED EXCEPTIONS IN A MULTITHREADING PROCESSOR

(75) Inventor: Kevin D. Kissell, Le Bar sur Loup (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 1374 days.

(21) Appl. No.: 11/313,272

(22) Filed: Dec. 20, 2005

(65) Prior Publication Data
US 2006/0161421 A1 Jul. 20, 2006

Related U.S. Application Data

(63) Continuation-in-part of application No. 10/929,097, filed on Aug. 27, 2004, now Pat. No. 7,424,599, which is a continuation-in-part of application No. 10/684,350, filed on Oct. 10, 2003, now Pat. No. 7,376,954, and a continuation-in-part of application No. 10/684,348, filed on Oct. 10, 2003.

(60) Provisional application No. 60/499,180, filed on Aug. 28, 2003, provisional application No. 60/502,358, filed on Sep. 12, 2003, provisional application No. 60/502,359, filed on Sep. 12, 2003.

(51) Int. Cl.
*G06F 9/445* (2006.01)
*G06F 9/455* (2006.01)
(52) U.S. Cl. ...................... 712/228; 712/227
(58) Field of Classification Search .................. None
See application file for complete search history.

(56) References Cited

U.S. PATENT DOCUMENTS 3,665,404 A 5/1972 Werner (Continued)

FOREIGN PATENT DOCUMENTS

EP 0725334 A1 8/1996

(Continued)

OTHER PUBLICATIONS

Ungerer et al. A Survey of Processors with Explicit Multithreading. ACM Computing Surveys, vol. 35, No. 1. Mar. 2003. pp. 29-63.

(Continued)

*Primary Examiner*—Eric Coleman
(74) *Attorney, Agent, or Firm*—Sterne, Kessler, Goldstein & Fox PLLC

(57) ABSTRACT

A multithreading microprocessor has a plurality of thread contexts (TCs) each including sufficient state, such as general purpose registers and program counter, to execute a separate thread of execution as one of a plurality of symmetric processors controlled by a multiprocessor operating system. However, the microprocessor hardware does not support the ability for one TC to direct an exception to another TC, i.e., to specify to which of the other TCs the exception is directed. A first thread running on a first TC of the operating system executes architected instructions to halt a second thread (either user or kernel thread) running on a second TC, save state of the second TC, write the second TC state to emulate an exception—including writing a restart register with the address of an exception handler, and unhalt the second TC to execute the exception hander.

68 Claims, 25 Drawing Sheets

U.S. PATENT DOCUMENTS

| | | | |
|---|---|---|---|
| 4,817,051 A | 3/1989 | Chang | |
| 4,843,541 A | 6/1989 | Bean et al. | |
| 4,860,190 A | 8/1989 | Kaneda et al. | |
| 5,159,686 A | 10/1992 | Chastain et al. | |
| 5,295,265 A | 3/1994 | Ducateau et al. | |
| 5,410,710 A | 4/1995 | Sarangdhar et al. | |
| 5,428,754 A | 6/1995 | Baldwin | |
| 5,499,349 A | 3/1996 | Nikhil et al. | |
| 5,511,192 A | 4/1996 | Shirakihara | |
| 5,515,538 A | 5/1996 | Kleiman | |
| 5,542,076 A | 7/1996 | Benson et al. | |
| 5,606,696 A * | 2/1997 | Ackerman et al. | 718/108 |
| 5,659,786 A | 8/1997 | George et al. | |
| 5,706,514 A | 1/1998 | Bonola | |
| 5,727,203 A | 3/1998 | Hapner et al. | |
| 5,758,142 A | 5/1998 | McFarling et al. | |
| 5,790,871 A | 8/1998 | Qureshi et al. | |
| 5,799,188 A | 8/1998 | Manikundalam et al. | |
| 5,812,811 A | 9/1998 | Dubey et al. | |
| 5,835,748 A | 11/1998 | Orenstein et al. | |
| 5,867,704 A | 2/1999 | Tanaka et al. | |
| 5,892,934 A | 4/1999 | Yard | |
| 5,933,627 A | 8/1999 | Parady | |
| 5,944,816 A | 8/1999 | Dutton et al. | |
| 5,949,994 A | 9/1999 | Dupree et al. | |
| 5,961,584 A | 10/1999 | Wolf | |
| 6,061,710 A | 5/2000 | Eickemeyer et al. | |
| 6,088,787 A | 7/2000 | Predko | |
| 6,128,720 A | 10/2000 | Pechanek et al. | |
| 6,175,916 B1 | 1/2001 | Ginsberg et al. | |
| 6,189,093 B1 | 2/2001 | Ekner et al. | |
| 6,205,414 B1 * | 3/2001 | Forsman et al. | 703/26 |
| 6,205,543 B1 | 3/2001 | Tremblay et al. | |
| 6,223,228 B1 | 4/2001 | Ryan et al. | |
| 6,240,531 B1 | 5/2001 | Spilo et al. | |
| 6,253,306 B1 | 6/2001 | Ben-Meir et al. | |
| 6,286,027 B1 | 9/2001 | Dwyer, III et al. | |
| 6,330,656 B1 | 12/2001 | Bealkowski et al. | |
| 6,330,661 B1 | 12/2001 | Torii | |
| 6,401,155 B1 | 6/2002 | Saville et al. | |
| 6,480,845 B1 * | 11/2002 | Egolf et al. | 1/1 |
| 6,560,626 B1 * | 5/2003 | Hogle et al. | 718/102 |
| 6,591,379 B1 | 7/2003 | LeVine et al. | |
| 6,643,759 B2 | 11/2003 | Andersson et al. | |
| 6,668,308 B2 | 12/2003 | Barroso et al. | |
| 6,671,791 B1 | 12/2003 | McGrath | |
| 6,675,192 B2 | 1/2004 | Emer et al. | |
| 6,687,812 B1 | 2/2004 | Shimada | |
| 6,697,935 B1 | 2/2004 | Borkenhagen et al. | |
| 6,738,796 B1 | 5/2004 | Mobini | |
| 6,779,065 B2 | 8/2004 | Murty et al. | |
| 6,877,083 B2 | 4/2005 | Arimilli et al. | |
| 6,889,319 B1 | 5/2005 | Rodgers et al. | |
| 6,920,634 B1 | 7/2005 | Tudor | |
| 6,922,745 B2 | 7/2005 | Kumar et al. | |
| 6,925,550 B2 | 8/2005 | Sprangle et al. | |
| 6,957,432 B2 | 10/2005 | Ballantyne | |
| 6,971,103 B2 | 11/2005 | Hokenek et al. | |
| 6,986,140 B2 | 1/2006 | Brenner et al. | |
| 6,993,598 B2 | 1/2006 | Pafumi et al. | |
| 7,020,879 B1 | 3/2006 | Nemirovsky et al. | |
| 7,031,992 B2 | 4/2006 | Khan et al. | |
| 7,065,094 B2 | 6/2006 | Petersen et al. | |
| 7,069,421 B1 | 6/2006 | Yates, Jr. et al. | |
| 7,073,042 B2 | 7/2006 | Uhlig et al. | |
| 7,093,106 B2 | 8/2006 | Ambekar et al. | |
| 7,127,561 B2 | 10/2006 | Hill et al. | |
| 7,134,124 B2 | 11/2006 | Ohsawa et al. | |
| 7,152,170 B2 | 12/2006 | Park | |
| 7,181,600 B1 | 2/2007 | Uhler | |
| 7,185,183 B1 | 2/2007 | Uhler | |
| 7,185,185 B2 | 2/2007 | Joy et al. | |
| 7,203,823 B2 | 4/2007 | Albuz et al. | |
| 7,216,338 B2 | 5/2007 | Barnett et al. | |
| 7,275,246 B1 * | 9/2007 | Yates et al. | 718/100 |
| 7,321,965 B2 | 1/2008 | Kissell | |
| 7,376,954 B2 | 5/2008 | Kissell | |
| 7,386,636 B2 | 6/2008 | Day et al. | |
| 7,418,585 B2 | 8/2008 | Kissell | |
| 7,424,599 B2 | 9/2008 | Kissell | |
| 7,428,732 B2 | 9/2008 | Sandri et al. | |
| 7,434,224 B2 * | 10/2008 | Lescouet et al. | 718/108 |
| 7,594,089 B2 | 9/2009 | Vishin et al. | |
| 7,600,135 B2 | 10/2009 | Jones | |
| 7,610,473 B2 | 10/2009 | Kissell | |
| 7,627,770 B2 * | 12/2009 | Jones | 713/300 |
| 7,657,683 B2 * | 2/2010 | Sridhar et al. | 710/260 |
| 7,665,088 B1 * | 2/2010 | Bugnion et al. | 718/1 |
| 7,676,660 B2 | 3/2010 | Kissell | |
| 7,676,664 B2 | 3/2010 | Kissell | |
| 7,689,867 B2 * | 3/2010 | Rosenbluth et al. | 714/34 |
| 7,694,304 B2 | 4/2010 | Kissell | |
| 7,711,931 B2 | 5/2010 | Kissell | |
| 7,725,689 B2 | 5/2010 | Kissell | |
| 7,725,697 B2 | 5/2010 | Kissell | |
| 7,730,291 B2 | 6/2010 | Kissell | |
| 2001/0034751 A1 * | 10/2001 | Eto et al. | 709/100 |
| 2001/0052053 A1 | 12/2001 | Nemirovsky et al. | |
| 2002/0016869 A1 | 2/2002 | Comeau et al. | |
| 2002/0083173 A1 | 6/2002 | Musoll et al. | |
| 2002/0083278 A1 | 6/2002 | Noyes | |
| 2002/0091915 A1 | 7/2002 | Parady | |
| 2002/0103847 A1 | 8/2002 | Potash | |
| 2002/0147760 A1 | 10/2002 | Torii | |
| 2002/0174318 A1 | 11/2002 | Stuttard et al. | |
| 2003/0014471 A1 | 1/2003 | Ohsawa et al. | |
| 2003/0028755 A1 | 2/2003 | Ohsawa et al. | |
| 2003/0074545 A1 | 4/2003 | Uhler | |
| 2003/0079094 A1 | 4/2003 | Rajwar et al. | |
| 2003/0093652 A1 | 5/2003 | Song | |
| 2003/0105796 A1 | 6/2003 | Sandri et al. | |
| 2003/0115245 A1 | 6/2003 | Fujisawa | |
| 2003/0126416 A1 | 7/2003 | Marr et al. | |
| 2003/0225816 A1 | 12/2003 | Morrow et al. | |
| 2004/0015684 A1 | 1/2004 | Peterson | |
| 2004/0073910 A1 * | 4/2004 | Hokenek et al. | 719/310 |
| 2004/0139306 A1 | 7/2004 | Albuz et al. | |
| 2005/0033889 A1 | 2/2005 | Hass et al. | |
| 2005/0050305 A1 | 3/2005 | Kissell | |
| 2005/0050395 A1 | 3/2005 | Kissell | |
| 2005/0055504 A1 | 3/2005 | Hass et al. | |
| 2005/0120194 A1 | 6/2005 | Kissell | |
| 2005/0125629 A1 | 6/2005 | Kissell | |
| 2005/0125795 A1 | 6/2005 | Kissell | |
| 2005/0240936 A1 | 10/2005 | Jones et al. | |
| 2005/0251613 A1 | 11/2005 | Kissell | |
| 2005/0251639 A1 | 11/2005 | Vishin et al. | |
| 2006/0161921 A1 | 7/2006 | Kissell | |
| 2006/0190945 A1 | 8/2006 | Kissell | |
| 2006/0190946 A1 | 8/2006 | Kissell | |
| 2006/0195683 A1 | 8/2006 | Kissell | |
| 2006/0206686 A1 | 9/2006 | Banerjee et al. | |
| 2007/0043935 A2 | 2/2007 | Kissell | |
| 2007/0044105 A2 | 2/2007 | Kissell | |
| 2007/0044106 A2 | 2/2007 | Kissell | |
| 2007/0106887 A1 | 5/2007 | Kissell | |
| 2007/0106988 A1 | 5/2007 | Kissell | |
| 2007/0106989 A1 | 5/2007 | Kissell | |
| 2007/0106990 A1 | 5/2007 | Kissell | |
| 2007/0186028 A2 | 8/2007 | Kissell | |

2008/0140998 A1    6/2008    Kissell

FOREIGN PATENT DOCUMENTS

| | | |
|---|---|---|
| EP | 0917057 A2 | 5/1999 |
| EP | 1089173 A2 | 4/2001 |
| JP | 8-249195 A | 9/1996 |
| JP | 2007-504536 | 3/2007 |
| WO | WO0153935 A1 | 7/2001 |
| WO | WO 03/019360 A2 | 3/2003 |
| WO | WO 2005/022385 A1 | 3/2005 |

OTHER PUBLICATIONS

Fotland, David. A Multithreaded Wireless Network Processor with Software I/O. Embedded Processor Forum. Jun. 18, 2003. In-State MDR;www.MDRonline.com.

Alverson et al., "Tera Hardware-Software Cooperation," Tera Computer Corporation—Proceedings of the IEEE/ACM SC97 Conference—Nov. 15-21, 1997 San Jose, CA.

Carter et al., "Performance and Programming Experience on the Tera MTA,"Tera Computer Corporation—SIAM Conference on Parallel Processing—Mar. 1999.

Marr et al. Hyper-Threading Technology. Intel Technology Journal, Feb. 14, 2002, vol. 6, No. 1, Intel Corporation, USA.

Sunsoft. Multithreaded Programming Guide. 1995. Sunsoft, A Sun Microsystems, Inc. Business. Mountainview, CA.

Engelschall, R.S., "pth GNU Portable Threads," Pth Manual, Online! Feb. 17, 2003, pp. 1-31, XP002315713.

Ishihara et al., "A Comparison of Concurrent Programming and Cooperative Multithreading," Euro-Par 2000 Parallel Processing. 6th International Euro-Par Conference. Proceedings (Lecture Notes in Computer Science vol. 1900) Springer-Verlag Berlin, Germany, Sep. 1, 2000, pp. 729-738, XP002315714, ISBN: 3-540-67956-1.

Frees, W., "Teilzeitarbeit Im Prozessor," Electronik, Franzis Verlag GmbH. Munche, DE, vol. 45, No. 9, Apr. 30, 1996, pp. 100-106, XP000595386, ISSN: 0013-5658 (English-language version of the search report or action which indicates the degree of relevance found by the foreign office is appended.).

Scheidhauer, Ralf, "Design, Implementierung and Evaluierung einer virtuellen Maschine fur Oz," Online!, Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Ungerer et al., "Utilising Parallel Resources by Speculation," Parallel and Distributed Processing, 1999. PDP '99. Proceedings of the Seventh Euromicro Workshop on Funchal, Portugal Feb. 3-5, 1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compiliation Techniques, 1996, Proceedings of the 1996 Conference in Boston, MA, USA, Oct. 20-23, 1996, Los Alamitos, CA, USA, IEEE Comput. Soc.,Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

UBICOM, Inc. A Next Generation Packet Processor for Wireless Networking. Apr. 15, 2003. UBICOM, Inc. Mountain View, CA, USA.

Bolychevsky et al. "Dynamic Scheduling in RISC Architectures." IEEE Proceedings Computers and Digital Techniques, vol. 143, No. 5. Sep. 24, 1996. pp. 309-317.

Kissell, Kevin D. "Microprocessor Forum (MPF) Conference Program Presentation: Architectural Extensions to the MIPS Architecture for High-Performance Embedded Systems." Oct. 15, 2003.

(webpage) Cray MTA-2 Historical Technical Papers, http://www.cray.com/products/programs/mta_2/resources.html. (Mar. 12, 2005), (formerly http://www.cray.com/products/systems/mta/psdocs.html (Jul. 2, 2004)).

Zaslavsky, Leonid et al. "A Scalable Approach for Solving Irregular Sparse Linear Systems on the Tera MTA Multithreaded Parallel Shared-Memory." Ninth SIAM Conference on Parallel Processing for Scientific Computing, San Antonio, TX. Mar. 1999.

Smith, Burton. "From Here to Petaflops." Keynote Address, Petaflops-systems Operations Working Review, (POWR), Bodega Bay, California, Jun. 1998.

Briggs, Preston. "Tuning the BLAS for the Tera." Workshop on Multithreaded Execution, Architecture and Compilation. (MTEAC 98), Jan. 1998.

Alverson, Gail et al., "Scheduling on the Tera MTA." IPPS '95 Workshop on Job Scheduling Strategies for Parallel Processing, Santa Barbara, CA, Apr. 1995, and in D.G.Feitelson and L. Rudolph, editors, Job Scheduling Strategies for Parallel Processing, Lecture Notes in Computer Science vol. 949, pp. 19-44, Springer-Verlag 1995.

Smith, Burton. "Folklore and Reality in High Performance Computing Slide Presentation." 1995.

Smith, Burton. "The Quest for General-Purpose Parallel Computing." 1994.

Alverson, Gail et al. "Exploiting Heterogeneous Parallelism on a Multithreaded Multiprocessor." 6th ACM International Conference on Supercomputing, Washington DC, Jul. 1992.

Callahan, David. "Recognizing and Parallelizing Bounded Recurrences." Fourth Workshop on Languages and Compilers for Parallel Computing. pp. 169-184. Aug. 1991.

Callahan, David et al. "Register Allocation via Hierarchical Graph Coloring." ACM SIGPLAN '91 Conference on Programming Language Design and Implementation, Jun. 1991.

Alverson, Robert. "Integer Division Using Reciprocals." 10th IEEE Symposium on Computer Arithmetic, Jun. 1991.

Callahan, David et al. "Improving Register Allocation for Subscripted Variables." ACM SIGPLAN Conference on Programming Language Design and Implementation, Jun. 1990.

Alverson, Robert et al. "The Tera Computer System." ACM International Conference on Supercomputing, pp. 1-6, Jun. 1990.

Smith, Burton. "The End of Architecture." Keynote Address, 17th Annual Symposium on Computer Architecture, Seattle, Washington, May 1990.

Alverson, Gail et al. "A Future-Based Parallel Language for a General Purpose Highly Parallel Computer." Languages and Compilers for Parallel Computing. pp. 95-113, MIT Press, Cambridge, Massachusetts, 1990.

"MIT Alewife Project: Home Page." retrieved from URL: http://caffish.csail.mit.edu/alewife/ on Jul. 2, 2004.

Arvind and R.A. Innaucci. "Two Fundamental Issues in Multiprocessing." in Proc. Of DFVLF-Conf. 1987 on Par.Proc.in Science and Eng., Bonn-Bad Godesberg, W. Germany, Jun. 1987.

Agarwal, A. et al., "April: A Processor Architecture for Multiprocessing," ACM SIGARCH Computer Architecture News, AMC, vol. 18, Issue 3a, pp. 104-114, Jun. 1990.

Culler, D.E., et al., Two Fundamental Limits on Dataflow Multiprocessing, 1993, Report No. UCB/CSD 92/716, pp. 1-14.

English Translation of Notice of Rejection for Japanese Patent Application No. 2006-524900, dated Nov. 28, 2008, 4 pages.

English Translation of Notice of Rejection for Japanese Patent Application No. 2006-524929, dated Nov. 28, 2008, 4 pages.

English Translation of Notice of Rejection for Japanese Patent Application No. 2006-524961, dated Nov. 28, 2008, 3 pages.

English Abstract of Japanese Patent Publication No. 2007-504536, published Mar. 1, 2007, 1 page.

English Abstract of Japanese Patent Publication No. 8-249195, published Sep. 27, 1996, 1 page.

Exception Handler, from Free Online Dictionary of Computing, 1 page, Oct. 31, 1994.

Kane, G. and Heinrich, J., *MIPS RISC Architecture*, Prentice Hall, Upper Saddle River, New Jersey (1992). (entire book submitted).

Kissell, K.D., *MIPS MT: A Multithreaded RISC Architecture for Embedded Real-Time Processing*, "High Performance Embedded Architectures and Compilers," Spring, vol. 4917/2008, pp. 9-21, 2008.
Kwak, H. et al., "Effects of Multithreading on Cache Performance," Computers, IEEE Transaction on, IEEE, vol. 48, Issue 2, pp. 176-184, Feb. 1999.
Lee, B. et al., "Simulation Study of Multithreaded Virtual Processor," IASTED International Conference on Parallel and Distributed Systems (Euro-PDS), pp. 1-6, Jul. 3, 1998.
MIPS32® Architecture for Programmers, vol. III: The MIPS32® Privileged Resource Architecture, Revision 2.50, Jul. 1, 2005, MIPS Technologies, Inc., 137 pages.
MIPS32® Architecture for Programmers, vol. IV-f: The MIPS® MT Application-Specific Extension to the MIPS32® Architecture, Revision 1.00, Sep. 28, 2005, MIPS Technologies, Inc., 83 pages.
Sweetman, D., See MIPS Run, Morgan Kaufmann Publishers, San Francisco, CA (2002). (entire book submitted).
Teller et al., Locating Multiprocessor TLBs at Memory, IEEE, Proc. of the Twenty-Seventh Annual Hawaii International Conference on System Sciences, 1994, pp. 554-563.
Thiébaut, D. et al., Improving Disk Cache Hit-Ratios Through Cache Partitioning, IEEE Transactions on Computers, vol. 41, No. 6 (1992), pp. 665-676.
Zilles, Craig B. et al. "The Use of Multithreading for Exception Handling." *micro*, p. 219. 32nd Annual International Symposium on Microarchitecture.
Dorai, Gautham K. et al. "Transparent Threads: Resource Sharing in SMT Processors for High Single-Thread Performance." Proceedings of the International Conference on Parallel Architectures and Compilation Techniques 2002.
Office Communication, dated Apr. 9, 2007, for U.S. Appl. No. 10/928,746, filed Aug. 27, 2004, 28 pages.
Office Communication, dated Oct. 23, 2007, for U.S. Appl. No. 10/928,746, filed Aug. 27, 2004, 27 pages.
Office Communication, dated Apr. 21, 2008, for U.S. Appl. No. 10/928,746, filed Aug. 27, 2004, 29 pages.
Office Communication, dated Jan. 22, 2009, for U.S. Appl. No. 10/928,746, filed Aug. 27, 2004, 31 pages.
Office Communication, dated Feb. 17, 2009, for U.S. Appl. No. 10/929,102, filed Aug. 27, 2004, 32 pages.
Office Communication, dated Oct. 12, 2006, for U.S. Appl. No. 10/929,342, filed Aug. 27, 2004, 26 pages.
Office Communication, dated Mar. 22, 2007, for U.S. Appl. No. 10/929,342, filed Aug. 27, 2004, 22 pages.
Office Communication, dated Apr. 6, 2007, for U.S. Appl. No. 10/954,988, filed Sep. 30, 2004, 8 pages.
Office Communication, dated Jan. 9, 2008, for U.S. Appl. No. 10/954,988, filed Sep. 30, 2004, 9 pages.
Office Communication, dated Jul. 29, 2008, for U.S. Appl. No. 10/954,988, filed Sep. 30, 2004, 8 pages.
Office Communication, dated Mar. 5, 2009, for U.S. Appl. No. 10/954,988, filed Sep. 30, 2004, 5 pages.
Office Communication, dated Dec. 19, 2006, for U.S. Appl. No. 10/955,231, filed Sep. 30, 2004, 19 pages.
Office Communication, dated Aug. 9, 2007, for U.S. Appl. No. 10/955,231, filed Sep. 30, 2004, 23 pages.
Office Communication, dated Mar. 6, 2007, for U.S. Appl. No. 11/330,914, filed Jan. 11, 2006, 21 pages.
Office Communication, dated Jul. 20, 2007, for U.S. Appl. No. 11/330,914, filed Jan. 11, 2006, 27 pages.
Office Communication, dated May 15, 2008, for U.S. Appl. No. 11/615,960, filed Dec. 23, 2006, 17 pages.
Office Communication, dated Dec. 8, 2008, for U.S. Appl. No. 11/615,960, filed Dec. 23, 2006, 15 pages.
Office Communication, dated Apr. 10, 2009, for U.S. Appl. No. 11/615,960, filed Dec. 23, 2006, 16 pages.
Office Communication, dated Oct. 17, 2008, for U.S. Appl. No. 11/615,963, filed Dec. 23, 2006, 16 pages.
Office Communication, dated Apr. 3, 2009, for U.S. Appl. No. 11/615,963, filed Dec. 23, 2006, 15 pages.
Office Communication, dated Oct. 15, 2008, for U.S. Appl. No. 11/615,964, filed Dec. 23, 2006, 18 pages.
Office Communication, dated Apr. 13, 2009, for U.S. Appl. No. 11/615,964, filed Dec. 23, 2006, 16 pages.
Office Communication, dated Oct. 16, 2008, for U.S. Appl. No. 11/615,965, filed Dec. 23, 2006, 17 pages.
Office Communication, dated Apr. 9, 2009, for U.S. Appl. No. 11/615,965, filed Dec. 23, 2006, 16 pages.
Office Communication, dated Dec. 22, 2008, for U.S. Appl. No. 11/949,603, filed Dec. 3, 2007, 8 pages.
Haggander, D. et al., "Optimizing Dynamic Memory Management in a Multithreaded Application Executing on a Multiprocessor," *Proceedings of the International Conference on Parallel Processing*, Aug. 10-14, 1998, pp. 262-269.
Kissell, K.D., U.S. Appl. No. 12/605,201, filed Oct. 23, 2009, entitled "Apparatus, Method, and Instruction for Initiation of Concurrent Instruction Streams in a Multithreading Microprocessor," 34 pages.
Office Communication, dated Jul. 6, 2009, for U.S. Appl. No. 11/615,960, filed Dec. 23, 2006, 16 pages.
Office Communication, dated Oct. 16, 2009, for U.S. Appl. No. 11/615,963, filed Dec. 23, 2006, 5 pages.
Office Communication, dated Oct. 20, 2009, for U.S. Appl. No. 11/615,964, filed Dec. 23, 2006, 5 pages.
MIPS32™ Architecture For Programmers vol. II The MIPS32™ Instruction Set. Revision 2.00. pp. 231 & 311. Document No. MD00086. Jun. 9, 2003. MIPS Technologies, Inc.
Patterson et al. "Computer Organization & Design: The Hardware/Software Interface." 1998. Morgan Kaufmann Publishers, Inc. Second Edition. pp. 592-593.
Silberschatz et al. "Operating Systems Concepts." 1994. Addison-Wesley Publishing Company. Fourth Edition. pp. 267-269, 271-272, 275.
Sunsoft. Multithreaded Programming Guide. 1995. Sunsoft, A Sun Microsystems, Inc. Business. Mountainview, CA.
Sunsoft. Multithreaded Programming Guide. 1994. Sunsoft, A Sun Microsystems, Inc. Business. Mountainview, CA. pp. 6, 12-13, 22-34 and 87.
Hennessy, John L. et al. "Computer Architecture A Quantitative Approach." Second Edition. San Francisco, CA: Morgan Kaufmann Publishers, Inc. 1996. pp. 70-73 and 87-89.
Heuring, Vincent P. and Jordan, Harry F. "Computer Systems and Architecture." Reading, Mass.: Addison Wesley Longman, Inc., © 1997. pp. 35-37.
Notice of Allowance, dated Oct. 16, 2009, for U.S. Appl. No. 11/615,965, filed Dec. 23, 2006.
Notice of Allowance, dated Jan. 12, 2010, for U.S. Appl. No. 11/615,964, filed Dec. 23, 2006.
Notice of Allowance, dated Jan. 15, 2010, for U.S. Appl. No. 11/615,960, filed Dec. 23, 2006.
Notice of Allowance, dated Jan. 19, 2010, for U.S. Appl. No. 11/615,963, filed Dec. 23, 2006.
Notice of Allowance, dated Jul. 13, 2010, for U.S. Appl. No. 11/330,915, filed Jan. 11, 2006.

* cited by examiner

Fig. 3B

*MFTR Instruction*    ⟵ 350

Source Register Selection Table

| u Value | sel Value | Register Selected | |
|---|---|---|---|
| 0 | n | Coprocessor 0 Register number rt, sel = sel | |
| 1 | 0 | GPR[rt] | |
| 1 | 1 | rt Value | Selection |
| | | 0 | Lo Register / Lo component of DSP Accumulator 0 |
| | | 1 | Hi Register / Hi component of DSP Accumulator 0 |
| | | 2 | ACX Register / ACX component of Accumulator 0 |
| | | 4 | Lo component of DSP Accumulator 1 |
| | | 5 | Hi component of DSP Accumulator 1 |
| | | 6 | ACX component of DSP Accumulator 1 |
| | | 8 | Lo component of DSP Accumulator 2 |
| | | 9 | Hi component of DSP Accumulator 2 |
| | | 10 | ACX component of DSP Accumulator 2 |
| | | 12 | Lo component of DSP Accumulator 3 |
| | | 13 | Hi component of DSP Accumulator 3 |
| | | 14 | ACX component of DSP Accumulator 3 |
| | | 16 | DSPControl register of DSP Accumulator |
| | | Other Values of rt, Reserved, Unpredictable | |
| 1 | 2 | FPR[rt] | |
| 1 | 3 | FPCR[rt] | |
| 1 | 4 | Cop2 Data[n], where n is composed by concatenating rx with rt, with rx providing the most significant bits. | |
| 1 | 5 | Cop2 Control[n], where n is composed by concatenating rx with rt, with rx providing the most significant bits. | |
| 1 | >5 | Reserved, Unpredictable | |

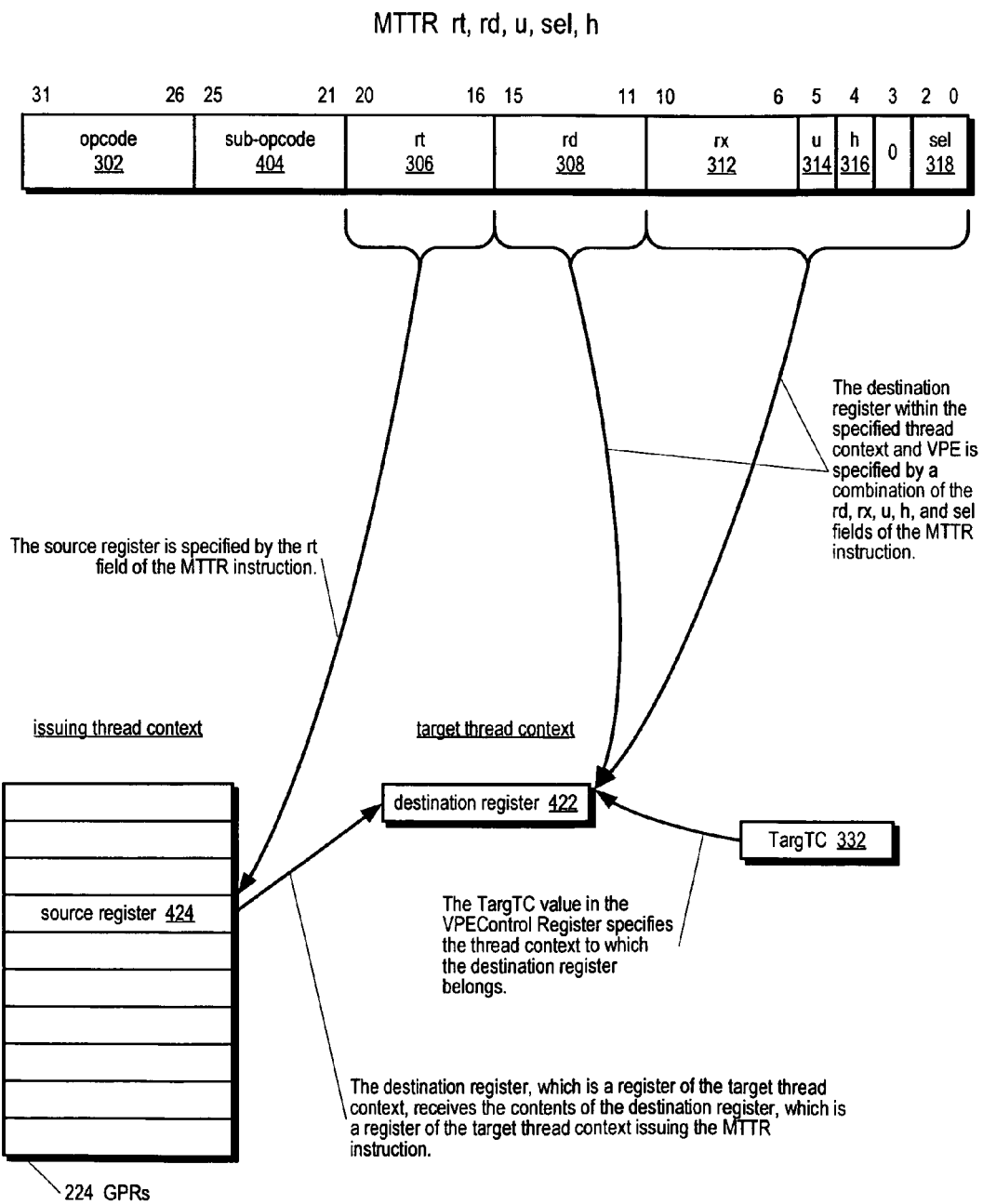

Fig. 4B

MTTR Instruction  450

Destination Register Selection Table

| u Value | sel Value | Register Selected | |
|---|---|---|---|
| 0 | n | Coprocessor 0 Register number rd, sel = sel | |
| 1 | 0 | GPR[rd] | |
| 1 | 1 | rd Value | Selection |
| | | 0 | Lo Register / Lo component of DSP Accumulator 0 |
| | | 1 | Hi Register / Hi component of DSP Accumulator 0 |
| | | 2 | ACX Register / ACX component of Accumulator 0 |
| | | 4 | Lo component of DSP Accumulator 1 |
| | | 5 | Hi component of DSP Accumulator 1 |
| | | 6 | ACX component of DSP Accumulator 1 |
| | | 8 | Lo component of DSP Accumulator 2 |
| | | 9 | Hi component of DSP Accumulator 2 |
| | | 10 | ACX component of DSP Accumulator 2 |
| | | 12 | Lo component of DSP Accumulator 3 |
| | | 13 | Hi component of DSP Accumulator 3 |
| | | 14 | ACX component of DSP Accumulator 3 |
| | | 16 | DSPControl register of DSP Accumulator |
| | | Other Values of rd, Reserved, Unpredictable | |
| 1 | 2 | FPR[rd] | |
| 1 | 3 | FPCR[rd] | |
| 1 | 4 | Cop2 Data[n], where n is composed by concatenating rx with rd, with rx providing the most significant bits. | |
| 1 | 5 | Cop2 Control[n], where n is composed by concatenating rx with rd, with rx providing the most significant bits. | |
| 1 | >5 | Reserved, Unpredictable | |

Fig. 5A

Multithreading-Related Registers

Register Table
/—500

| Register Name | CP0 Register Number (rt/rd) | Register Select Number (sel) | Description |
|---|---|---|---|
| MVPControl 501 | 0 | 1 | Per-Processor register containing global multithreading configuration data |
| MVPConf0 502 | 0 | 2 | Per-Processor multi-VPE dynamic configuration information |
| MVPConf1 503 | 0 | 3 | Per-Processor multi-VPE dynamic configuration information |
| VPEControl 504 | 1 | 1 | Per-VPE register containing thread configuration data |
| VPEConf0 505 | 1 | 2 | Per-VPE multi-thread configuration information |
| VPEConf1 506 | 1 | 3 | Per-VPE multi-thread configuration information |
| YQMask 591 | 1 | 4 | Per-VPE register defining which YIELD qualifier bits may be used without generating an exception |
| VPESchedule 592 | 1 | 5 | Per-VPE register to manage scheduling of a VPE within a processor |
| VPEScheFBack 593 | 1 | 6 | Per-VPE register to provide scheduling feedback to software |
| TCStatus 508 | 4 | 1 | Per-TC status information |
| TCBind 556 | 4 | 2 | Per-TC information about TC ID and VPE binding |
| TCRestart 594 | 4 | 3 | Per-TC value of restart program counter for the associated thread of execution |
| TCHalt 509 | 4 | 4 | Per-TC register controlling Halt state of TC |
| TCContext 595 | 4 | 5 | Per-TC Read/Write Storage for OS use |
| TCSchedule 596 | 4 | 6 | Per-TC register to manage scheduling of a TC |
| TCScheFBack 597 | 4 | 7 | Per-TC register to provide scheduling feedback to software |
| EPC 598 | 14 | 0 | Per-VPE error program counter register |
| Status 571 | 12 | 0 | Per-VPE status information |

Fig. 5B

MVPControl Register 501

| 31 | | 3 | 2 | 1 | 0 |
|---|---|---|---|---|---|
| 0 | | | STLB | VPC | EVP |
| | | | 511 | 512 | 513 |

| Fields | | Description | Read/Write | Reset State |
|---|---|---|---|---|
| Name | Bits | | | |
| STLB | 2 | Share TLBs. Modifiable only if the VPC bit was set prior to the write to the register of a new value. When set, the full compliment of TLBs of a processor is shared by all VPEs on the processor, regardless of the programming of the Config1.MMU_Size register fields.<br><br>When STLB is set:<br>• The virtual address and ASID spaces are unified across all VPEs sharing the TLB.<br>• The TLB logic must ensure that a TLBWR instruction can never write to a TLB entry which corresponds to the valid Index register value of any VPE sharing the TLB.<br>• The creation of duplicate TLB entries is silently suppressed instead of generating a Machine Check exception.<br>• TLBWRs may have UNPREDICTABLE results if there are fewer total unwired TLB entries than there are operational VPEs sharing the TLB.<br>• TLBWRs may have UNPREDICTABLE results if the Wired register values are not identical across all VPEs sharing the TLB.<br><br>For correct software operation, it is recommended that all MMU_Size fields be set to the size of the shared TLB when STLB is set. When not in use for TLB maintenance, software should leave the Index register of each VPE set to an invalid value, with the P bit set. | R if VPC = 0, R/W if VPC = 1 | 0 |
| VPC | 1 | Indicates that Processor is in a VPE Configuration State. When VPC is set, some normally "Preset" configuration register fields become writable, to allow for dynamic configuration of processor resources.<br><br>Settable by software only if the VPEConf0.MVP bit is also set for the VPE issuing the modifying instruction, the VPC bit may be cleared regardless of the MVP state, allowing the processor to de-configure its own MVP capability.<br><br>Processor behavior is UNDEFINED if VPC and EVP are both in a set state at the same time. | R/RW | 0 |
| EVP | 0 | Enable Virtual Processors. Modifiable only if the VPEConf0.MVP bit is set for the VPE issuing the modifying instruction. Set by EVPE instruction and cleared by DVPE instruction. If set, all activated VPEs on a processor fetch and execute independently. If cleared, only a single instruction stream on a single VPE can run. | R/RW | Preset |
| 0 | 31:3 | Must be written as zero; return zero on read. | 0 | 0 |

Fig. 5C

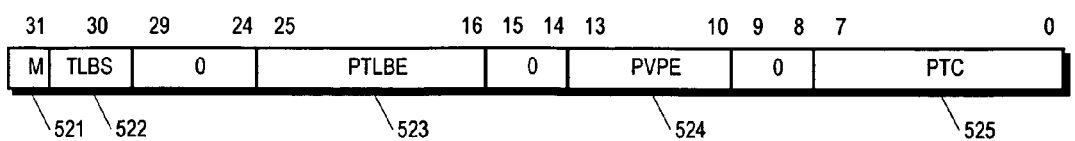

MVPConf0 Register — 502

| 31 | 30 29 | 24 25 | 16 | 15 14 | 13 | 10 | 9 8 | 7 | 0 |
|---|---|---|---|---|---|---|---|---|---|
| M | TLBS | 0 | | PTLBE | 0 | PVPE | 0 | PTC | |

521  522  523  524  525

| Fields | | Description | Read/ Write | Reset State |
|---|---|---|---|---|
| Name | Bits | | | |
| M | 31 | This bit is reserved to indicate that a MVPConf1 register is present. If the MVPConf1 register is not implemented, this bit should read as a 0. If the MVPConf1 register is implemented, this bit should read as a 1. | R | Preset |
| TLBS | 29 | TLB Sharable. Indicates that TLB sharing amongst all VPEs of a VMP is possible. TLB sharing is enabled by the STLB bit of the MVPControl register. | R | Preset |
| PTLBE | 25:16 | Total processor compliment of allocatable TLB entry pairs. | R | Preset |
| PVPE | 13:10 | Total processor compliment of VPE contexts - 1 | R | Preset |
| PTC | 7:0 | Total processor compliment of TCs - 1 | R | Preset |
| 0 | 29:24, 15:14, 9:8 | Reserved. Reads as zero, must be written as zero. | R | 0 |

Fig. 5D

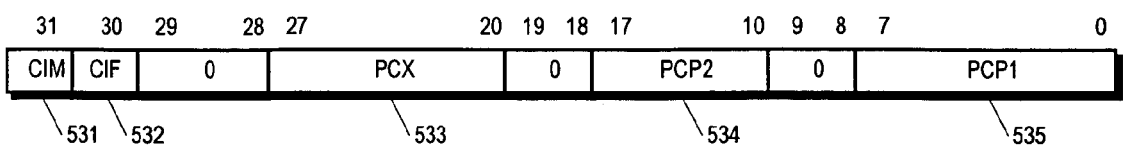

MVPConf1 Register — 503

| | 31 | 30 | 29   28 | 27      20 | 19  18 | 17    10 | 9  8 | 7      0 |
|---|---|---|---|---|---|---|---|---|
| | CIM | CIF | 0 | PCX | 0 | PCP2 | 0 | PCP1 |

531   532          533              534              535

| Fields | | Description | Read/Write | Reset State |
|---|---|---|---|---|
| Name | Bits | | | |
| CIM | 31 | Allocatable CP1 coprocessors are media-extension capable | R | Preset |
| CIF | 30 | Allocatable CP1 coprocessors are floating-point capable | R | Preset |
| PCX | 27:20 | Total processor compliment of CorExtend(tm) UDI state instantiations available, for UDI blocks with persistent state. | R | Preset |
| PCP2 | 17:10 | Total processor compliment of integrated and allocatable Coprocessor 2 contexts | R | Preset |
| PCP1 | 7:0 | Total processor compliment of integrated and allocatable FP/MDMX Coprocessors contexts | R | Preset |
| 0 | 29:28, 19:18, 9:8 | Reserved. Reads as zero, must be written as zero. | R | 0 |

Fig. 5E

VPEControl Register — 504

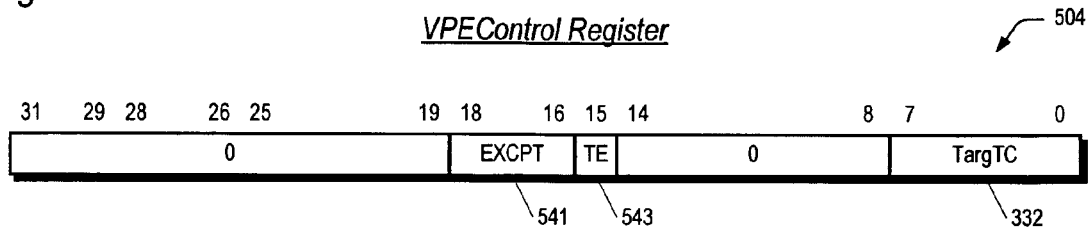

| Fields | | Description | | | Read/ Write | Reset State |
|---|---|---|---|---|---|---|
| Name | Bits | | | | | |
| EXCPT | 18:16 | Exception code of most recently dispatched Thread exception | Value | Meaning | R | 0 |
| | | | 0 | Thread Underflow | | |
| | | | 1 | Thread Overflow | | |
| | | | 2 | Invalid YIELD Qualifier | | |
| | | | 3 | Gating Storage Exception | | |
| | | | 4 | YIELD Sched. Exception | | |
| | | | 5 | GS Scheduler Exception | | |
| | | | 6-7 | Reserved | | |
| TE | 15 | Threads Enabled. Set by EMT instruction, cleared by DMT instruction. If set, multiple TCs may be simultaneously active. If cleared, only one thread may execute on the VPE. | | | R/W | 0 |
| TargTC | 7:0 | TC number to be used on MTTR and MFTR instructions. | | | R/W | Undefined |
| 0 | 31:22, 19, 14:18 | Must be written as zero; return zero on read. | | | 0 | 0 |

Fig. 5F

VPEConf0 Register  505

```
31 30                                                    2  1   0
┌──┬──────────────────────────────────────────────┬─────┬───┬───┐
│ M│                      0                       │     │MVP│VPA│
└──┴──────────────────────────────────────────────┴─────┴───┴───┘
  551                                                 553  552
```

| Fields | | Description | Read/ Write | Reset State |
|---|---|---|---|---|
| Name | Bits | | | |
| M | 31 | This bit is reserved to indicate that a VPEConf1 register is present. If the VPEConf1 register is not implemented, this bit should read as a 0. If the VPEConf1 register is implemented, this bit should read as a 1. | R | Preset |
| MVP | 1 | Master Virtual Processor. If set, the VPE can access the registers of other VPEs of the same VMP, using MTTR/MFTR, and can modify the contents of the MVPControl register, thus acquiring the capability to manipulate and configure other VPEs sharing the same processor. | R | Preset |
| VPA | 0 | Virtual Processor Activated. If set, the VPE will schedule threads and execute instructions so long as the EVP bit of the MVPControl register enables multi-VPE execution. | R | Preset |
| 0 | 30:29, 20, 15:2 | Reserved. Reads as zero, must be written as zero. | R | 0 |

Fig. 5G

VPEConf1 Register 506

| 31 | 28 | 27 | | 20 | 19 | 18 | 17 | | 10 | 9 | 8 | 7 | | 0 |
|---|---|---|---|---|---|---|---|---|---|---|---|---|---|---|
| 0 | | NCX | | | 0 | | NCP2 | | | 0 | | NCP1 | | |

561, 562, 563

| Fields | | Description | Read/ Write | Reset State |
|---|---|---|---|---|
| Name | Bits | | | |
| NCX | 27:20 | Number of CorExtend(tm) UDI state instantiations available, for UDI blocks with persistent state. | R | Preset |
| NCP2 | 17:10 | Number of Coprocessor 2 contexts available. | R | Preset |
| NCP1 | 7:0 | Number of Coprocessor 1 contexts available | R | Preset |
| 0 | 31:28, 19:18, 9:8 | Reserved. Reads as zero, must be written as zero. | R | 0 |

*Fig. 5H*
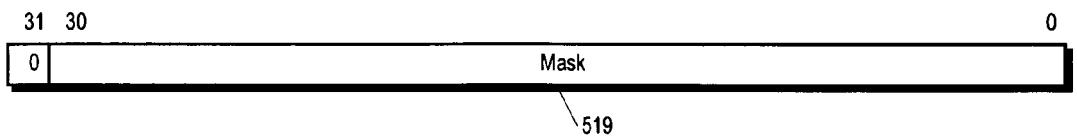
*YQMask Register* — 591
| Fields | | Description | Read/Write | Reset State |
| --- | --- | --- | --- | --- |
| Name | Bits | | | |
| Mask | 30:0 | Bit vector which determines which values may be used as external state qualifiers by YIELD instructions. | R/W | 0 |
| 0 | 31 | Must be written as zero; return zero on read. | 0 | 0 |
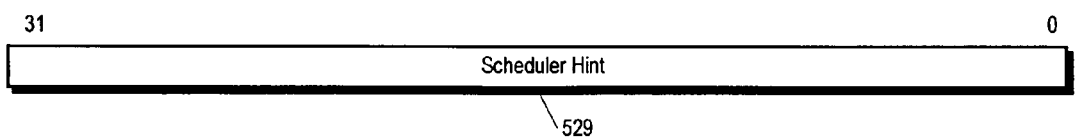
*VPESchedule Register* — 592
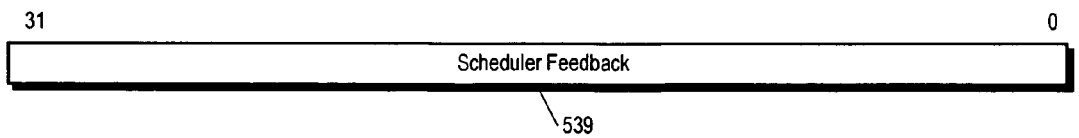
*VPEScheFBack Register* — 593

Fig. 5J

TCStatus Register

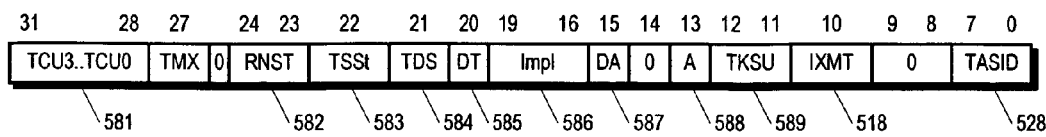

| Fields | | Description | Read/Write | Reset State |
|---|---|---|---|---|
| Name | Bits | | | |
| TCU3..TCU0 | 31:28 | Controls access of a TC to coprocessors 3,2,1, and 0 respectively. | R/W | Undefined |
| TMX | 27 | Controls access of a TC to extended media processing state, such as MDMX and DSP ASE accumulators. | R/W | 0 |
| RNST | 24:23 | Run State of TC. Indicates the Running vs. Blocked state of the TC and the reason for blockage. Value is stable only if TC is Halted and examined by another TC using an MFTR operation. <br> Val / Meaning: <br> 0 / Running <br> 1 / Blocked on WAIT <br> 2 / Blocked on YIELD <br> 3 / Blocked on Gating Storage | R | 0 |
| TDS | 21 | Thread stopped in branch Delay Slot. If a TC is Halted such that the next instruction to issue would be an instruction in a branch delay slot, the TCRestart register will contain the address of the branch instruction, and the TDS bit will be set. | R | 0 |
| DT | 20 | Dirty TC. This bit is set by hardware whenever any software-visible register value of the associated TC is written, including writes of GPR rd operands of FORK instructions. | R/W | 1 |
| Impl | 19:16 | These bits are implementation dependent | ImplDep | ImplDep |
| DA | 15 | Dynamic Allocation enable. If set, TC may be allocated/deallocated/scheduled by the FORK and YIELD instructions. | R/W | 0 |
| A | 13 | Thread Activated. Set automatically when a FORK instruction allocates the TC, and cleared automatically when a YIELD $0 instruction deallocates it. | R/W | 1 for default/ reset TC, 0 for others |
| TKSU | 12:11 | This is the per-TC Kernel/Supervisor/User state. | R/W | Undefined |
| IXMT | 10 | Interrupt Exempt. If set, the associated TC will not be used by asynchronous exception handlers such as interrupts. | R/W | 0 |
| TASID | 7:0 | This is the per-TC ASID value. | R/W | Undefined |
| 0 | 26:25, 22, 14, 9:8 | Must be written as zero; return zero on read. | 0 | 0 |

Fig. 5K

TCRestart Register — 594

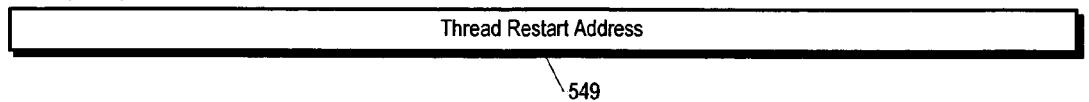

Thread Restart Address — 549

TCHalt Register — 509

599

| Fields | | Description | Read/ Write | Reset State |
|---|---|---|---|---|
| Name | Bits | | | |
| H | 0 | Thread Halted. When set, the associated thread has been halted and cannot be allocated, activated, or scheduled. | R/W | 0 |
| 0 | 31:1 | Must be written as zero; return zero on read. | 0 | 0 |

TCBind Register — 556

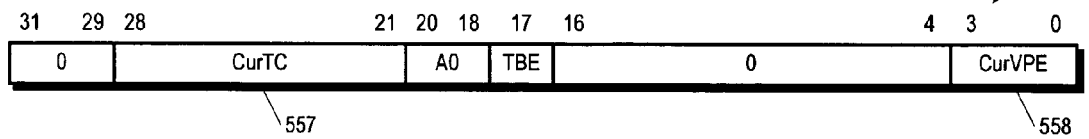

557 · 558

| Fields | | Description | Read/ Write | Reset State |
|---|---|---|---|---|
| Name | Bits | | | |
| CurTC | 28:21 | Indicates the number (index) of the TC. | R | TC# |
| A0 | 20:18 | Architecturally zero-valued field providing least-significant bits when a TCBind value is shifted right to be used as a scaled index into arrays of 32 or 64-bit values. | R | 0 |
| TBE | 17 | TC Bus Error. Set by hardware when a transaction causing a bus error is identified as resulting from a load or store issued by the TC. | R/W | 0 |
| CurVPE | 3:0 | Indicates and controls the binding of the TC to a VPE. Field is optionally Read/Write only when the VPC bit of the MVPControl register is set. | R or R/W | 0 for TC 0, preset for all others |
| 0 | 31:29, 16:4 | Must be written as zero; return zero on read. | 0 | 0 |

*Fig. 5L*
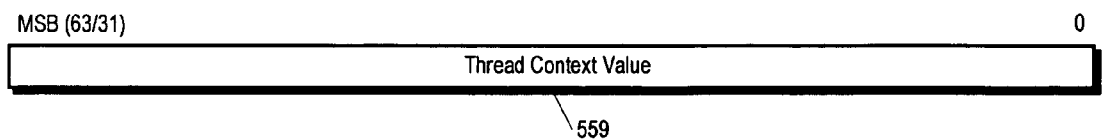
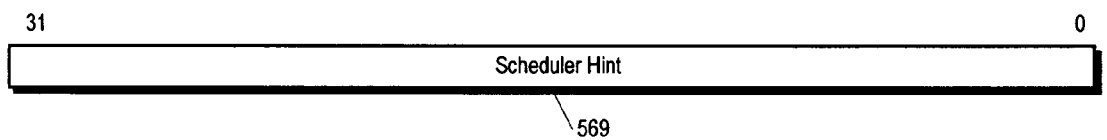
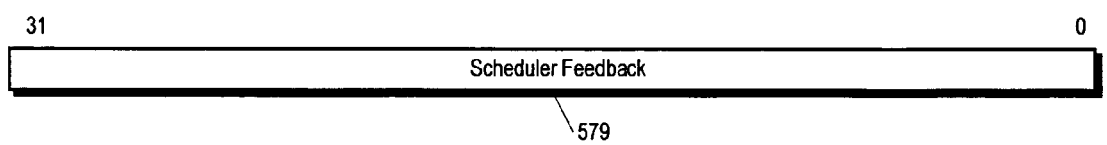
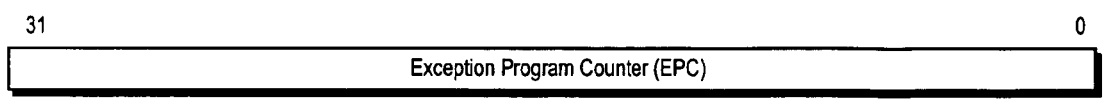

Fig. 5M

Coprocessor 0 Status Register — 571

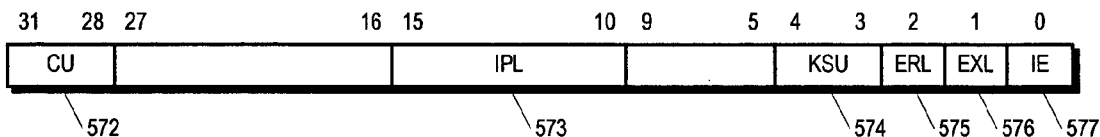

| 31 | 28 | 27 | 16 | 15 | 10 | 9 | 5 | 4 | 3 | 2 | 1 | 0 |

Fields: CU (572), IPL (573), KSU (574), ERL (575), EXL (576), IE (577)

| Fields Name | Bits | Description | Read/Write |
|---|---|---|---|
| CU (CU3..CU0) | 31..28 | Controls access to coprocessors 3, 2, 1, and 0, respectively: 0 = access not allowed; 1 = access allowed. Coprocessor 0 is always usable when the processor is running in Kernel Mode or Debug Mode, independent of the state of the CU0 bit. | R/W |
| IPL | 15..10 | Interrupt Priority Level. | R/W |
| KSU | 4..3 | If Supervisor Mode is implemented, the encoding of this field denotes the base operating mode of the processor. The encoding of this field is:<br><br>| Encoding | Meaning |<br>|---|---|<br>| 0b00 | Base mode is Kernel Mode |<br>| 0b01 | Base mode is Supervisor Mode |<br>| 0b10 | Base mode is User Mode |<br>| 0b11 | Reserved. | | R/W |
| ERL | 2 | Error Level; Set by the processor when a Reset, Soft Reset, NMI or Cache Error exception are taken.<br><br>| Encoding | Meaning |<br>|---|---|<br>| 0 | Normal Level |<br>| 1 | Error Level |<br><br>When ERL is set:<br>• The processor is running in kernel mode<br>• Hardware and software interrupts are disabled<br>• The ERET instruction will use the return address held in ErrorEPC instead of EPC | R/W |
| EXL | 1 | Exception Level; Set by the processor when any exception other than Reset, Soft Reset, NMI or Cache Error exception are taken.<br><br>| Encoding | Meaning |<br>|---|---|<br>| 0 | Normal Level |<br>| 1 | Error Level |<br><br>When EXL is set:<br>• The processor is running in Kernel Mode<br>• Hardware and software interrupts are disabled.<br>• TLB Refill exceptions use the general exception vector instead of the TLB Refill vector.<br>• EPC, CauseBD and SRSCtl will not be updated if another exception is taken | R/W |
| IE | 0 | Interrupt Enable: Acts as the master enable for software and hardware interrupts:<br><br>| Encoding | Meaning |<br>|---|---|<br>| 0 | Interrupts are disabled |<br>| 1 | Interrupts are enabled | | R/W |

MFTR Data Paths

*MTTR Data Paths*

SOFTWARE EMULATION OF DIRECTED EXCEPTIONS IN A MULTITHREADING PROCESSOR

CROSS REFERENCE TO RELATED APPLICATIONS

This application is a continuation-in-part (CIP) of the following Non-Provisional U.S. Patent Application, which is hereby incorporated by reference in its entirety for all purposes:

| Ser. No. | Filing Date | Title |
| --- | --- | --- |
| 10/929,097 now U.S. Pat. No. 7,424,599 | Aug. 27, 2004 | APPARATUS, METHOD, AND INSTRUCTION FOR SOFTWARE MANAGEMENT OF MULTIPLE COMPUTATIONAL CONTEXTS IN A MULTITHREADED MICROPROCESSOR |

The above Non-Provisional U.S. Patent application is a continuation-in-part (CIP) of the following Non-Provisional U.S. Patent Applications, which are hereby incorporated by reference in their entirety for all purposes:

| Ser. No. | Filing Date | Title |
| --- | --- | --- |
| 10/684,350 now U.S. Pat. No. 7,376,954 | Oct. 10, 2003 | MECHANISMS FOR ASSURING QUALITY OF SERVICE FOR PROGRAMS EXECUTING ON A MULTITHREADED PROCESSOR |
| 10/684,348 | Oct. 10, 2003 | INTEGRATED MECHANISM FOR SUSPENSION AND DEALLOCATION OF COMPUTATIONAL THREADS OF EXECUTION IN A PROCESSOR |

The above two Non-Provisional U.S. Patent Applications claim the benefit of the following expired U.S. Provisional Applications, which are hereby incorporated by reference in their entirety for all purposes:

| Ser. No. | Filing Date | Title |
| --- | --- | --- |
| 60/499,180 | Aug. 28, 2003 | MULTITHREADING APPLICATION SPECIFIC EXTENSION |
| 60/502,358 | Sep. 12, 2003 | MULTITHREADING APPLICATION SPECIFIC EXTENSION TO A PROCESSOR ARCHITECTURE |
| 60/502,359 | Sep. 12, 2003 | MULTITHREADING APPLICATION SPECIFIC EXTENSION TO A PROCESSOR ARCHITECTURE |

FIELD OF THE INVENTION

The present invention relates in general to the field of multithreaded microprocessors, and particularly to a multiprocessor operating system directing inter-processor interrupts thereon.

BACKGROUND OF THE INVENTION

Microprocessor designers employ many techniques to increase microprocessor performance. Most microprocessors operate using a clock signal running at a fixed frequency. Each clock cycle the circuits of the microprocessor perform their respective functions. According to Hennessy and Patterson (see *Computer Architecture: A Quantitative Approach*, 3rd Edition), the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Large performance increases have been realized by architectural and organizational notions that improve the instructions per clock cycle, in particular by notions of parallelism.

One notion of parallelism that has improved the clock frequency of microprocessors is pipelining, which overlaps execution of multiple instructions within pipeline stages of the microprocessor. In an ideal situation, each clock cycle one instruction moves down the pipeline to a new stage, which performs a different function on the instruction. Thus, although each individual instruction takes multiple clock cycles to complete, the multiple cycles of the individual instructions overlap. Because the circuitry of each individual pipeline stage is only required to perform a small function relative to the sum of the functions required to be performed by a non-pipelined processor, the clock cycle of the pipelined processor may be reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle. These microprocessors are commonly referred to as superscalar microprocessors.

What has been discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions. In other words, because each thread context has its own program counter and general purpose register set, the multithreading microprocessor does not have to save and restore these resources when switching between threads, thereby potentially reducing the average number of clock cycles per instruction.

One example of a performance-constraining issue addressed by multithreading microprocessors is the fact that accesses to memory outside the microprocessor that must be performed due to a cache miss typically have a relatively long latency. It is common for the memory access time of a contemporary microprocessor-based computer system to be between one and two orders of magnitude greater than the cache hit access time. Instructions dependent upon the data missing in the cache are stalled in the pipeline waiting for the data to come from memory. Consequently, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples of performance-constraining issues addressed by multithreading microprocessors are pipeline stalls and their accompanying idle cycles due to a data dependence; or due to a long latency instruction such as a divide instruction, floating-point instruction, or the like; or due to a limited hardware resource conflict. Again, the ability of a multithreaded microprocessor to issue instructions from independent threads to pipeline stages that would otherwise be idle may significantly reduce the time required to execute the program or collection of programs comprising the threads.

Multiprocessing is a technique related to multithreading that exploits thread-level parallelism, albeit at a higher system level, to execute a program or collection of programs faster. In a conventional multiprocessor system, multiple processors, or CPUs, share a memory system and I/O devices. A multiprocessor (MP) operating system facilitates the simultaneous execution of a program or collection of programs on the multiprocessor system. For example, the system may include multiple Pentium IV processors all sharing a memory and I/O subsystem running an MP operating system—such as Linux SMP, an MP-capable version of Windows, Sun Solaris, etc., and executing one or more application programs concurrently.

Multithreading microprocessors exploit thread-level parallelism at an even lower level than multiprocessor systems by sharing instruction fetch, issue, and execution resources, as described above, in addition to sharing a memory system and I/O devices. An MP operating system may run on a multithreading microprocessor if the multithreading microprocessor presents multiple processors, or CPUs, in an architected manner recognized by the MP operating system. Perhaps the most highly publicized example is the Hyper-Threading (HT) Technology employed in the Intel® Xeon® multithreading microprocessor. An HT Xeon includes effectively the same execution resources (e.g., caches, execution units, branch predictors) as a non-HT Xeon processor, but replicates the architectural state to present multiple distinct logical processors to an MP OS. That is, the MP operating system recognizes each logical processor as a separate processor, or CPU, each presenting the architecture of a single processor. The cost of replicating the architectural state for the additional logical processor in the Xeon in terms of additional chip size and power consumption is almost 5%.

One aspect of the architecture presented by each of the multiple processors to the MP operating system is the ability to handle a list of architected exceptions. Generally speaking, an exception is an error or other unusual condition or event that occurs during the execution of a program. In response to an exception, the processor saves the state of the currently executing program and begins fetching and executing instructions at a predetermined address, thereby transferring execution to an alternate program, commonly referred to as an exception handler located at the predefined address. The predefined address may be common to all exceptions in the list of architected exception types or may be unique to some or all of the exception types. The exception handler, when appropriate, may restore the state and resume execution of the previously executing program. Examples of common exceptions include a page fault, a divide by zero, a faulty address generated by the program, a bus error encountered by the processor when attempting to read a memory location, or an invalid instruction exception caused by an invalid instruction opcode or invalid instruction operand.

Another common exception type is an interrupt, or interrupt request. Interrupts are typically grouped as hardware interrupts and software interrupts. A software interrupt is generated when the currently executing program executes an architected software interrupt instruction, which causes an exception that transfers control to the architected interrupt vector associated with the software interrupt to invoke an interrupt service routine, or handler. A hardware interrupt is a signal received by the processor from a device to request service by the processor. Examples of interrupting devices are disk drives, direct memory access controllers, and timers. In response to the interrupt request, the processor transfers control to an architected interrupt vector associated with the interrupt request to invoke an interrupt service routine, or handler.

One function which MP operating systems need to be able to perform is for one processor, or CPU, to interrupt the operation of another specific one of the processors, and in some cases to all the processors in the system. These operations are sometimes referred to as inter-processor interrupts (IPIs). Commonly in a multiprocessor system, each processor includes an interrupt controller, which enables each processor to direct an interrupt specifically to each of the other processors. The HT Xeon processors, for example, include a replicated Advanced Programmable Interrupt Controller (APIC) for each logical processor, which enables each logical processor to send a hardware interrupt specifically to each of the other logical processors.

An example of the use of an IPI is in preemptive time-sharing operating systems, which receive periodic timer interrupts, in response to which the operating system may perform a task switch on one or more of the processors to schedule a different task or process to execute on the processors. In Linux SMP, for example, the timer handling routine running on the processor that receives the timer interrupt not only schedules the tasks on its own processor, but also directs an interrupt to each of the other processors to cause them to schedule their tasks. Each processor has an architected interrupt mechanism, which the timer interrupt-receiving processor uses to direct an IPI to each of the other processors in the multiprocessor system.

Another multithreading microprocessor core architecture which takes a somewhat different approach than, for example, the Intel HT architecture is the MIPS® Multithreading (MT) Application-Specific Extension (ASE) to the MIPS32® Architecture. The MIPS MT ASE allows two distinct, but not mutually-exclusive, multithreading capabilities. A single MIPS MT ASE microprocessor core comprises one or more Virtual Processing Elements (VPEs), and each VPE comprises one or more thread contexts (TCs). This architecture is described in the document MIPS32® Architecture for Programmers Volume IV-f: The MIPS® MT Application-Specific Extension (ASE) to the MIPS32® Architecture, Document Number: MD00378, Revision 1.00, Sep. 28, 2005, available from MIPS Technologies, 1225 Charleston Road, Mountain View, Calif. 94043-1353, which is hereby incorporated by reference in its entirety for all purposes. Embodiments of the architecture are also described in the above-referenced U.S. Patent Applications.

In the MIPS MT ASE architecture, an N-VPE processor core presents to an SMP operating system an N-way symmetric multiprocessor. In particular, it presents to the SMP operating system N MIPS32® Architecture processors. Thus, SMP operating systems configured to run on a conventional multiprocessor system having N MIPS32 processors without the MT ASE capability will run on a single MIPS32 core with the MT ASE capabilities with little or no modifications to the SMP operating system. In particular, each VPE presents an architected exception domain to the SMP operating system including an architected list of exceptions that the VPE will handle. The list includes interrupts that one VPE may direct to another specific VPE in the multithreading microprocessor, somewhat similar to the HT Xeon approach.

As mentioned above, each VPE comprises at least one thread context, and may comprise multiple thread contexts. A thread context in the MIPS MT ASE comprises a program counter representation, a set of general purpose registers, a set of multiplier result registers, and some of the MIPS Privileged Resource Architecture (PRA) Coprocessor 0 state, such as state describing the execution privilege level and address space identifier (ASID) of each thread context. The thread contexts are relatively lightweight compared to VPEs with respect to storage elements required to store state and are therefore less expensive than VPEs in terms of chip area and power consumption. Advantageously, the lightweight feature of MIPS MT ASE thread contexts makes them inherently more scalable than VPEs, and potentially than Intel HT logical processors, for example.

In particular, in the interest of providing lightweight thread contexts and the concomitant advantages, such as improved scalability, within the MIPS MT ASE, the domain for exception handling is at the VPE level, not the thread context level. In particular, a VPE handles asynchronous exceptions, such as interrupts, opportunistically. That is, when an asynchronous exception is raised to the VPE, the VPE selects one of the eligible (i.e., not marked as exempt from servicing asynchronous exceptions) thread contexts to execute the exception handler. Thus, although there is an architected means for a thread context to direct an asynchronous exception to a VPE, the thread context cannot specify to the VPE which thread context should handle the exception within the VPE in a MIPS MT ASE processor, i.e., the exception architecture does not provide an explicit way for the thread context to direct an asynchronous exception to a specific other thread context.

Therefore, what is needed is a system and method for directing an asynchronous exception from one thread context to another specific thread context on a multithreading microprocessor in which such an operation is not architecturally supported.

BRIEF SUMMARY OF INVENTION

The present invention provides a system and method for software emulation of the operation of a first thread context to direct an exception to another specified thread context in a multithreading microprocessor whose architecture does not explicitly support such an operation. The multithreading microprocessor includes architected instructions that enable one thread context to directly read and write the other thread contexts. In particular, the instructions enable an operating system thread running on a first thread context to halt the execution of a second thread running on a second thread context; to emulate the hardware exception actions, such as saving the second thread context current program counter value and populating it with the address of the proper exception handler, saving the second thread context execution privilege level and setting it to kernel execution privilege level, and disabling the second thread context from receiving interrupts; and to commence execution of the operating system exception handler on the second thread context. By the operating system emulating the hardware exception actions, when the exception handler returns from the exception, the interrupted second thread is recommenced running on the second thread context. In one embodiment of the present invention, the software emulation of directed exceptions enables each implemented thread context of a MIPS multithreading microprocessor appear to an SMP operating system as its own CPU, so that the number of SMP OS CPUs is not limited to the number of VPEs implemented on the microprocessor.

In one aspect, the present invention provides a method for performing software emulation of a directed exception in a multithreading processor running a multiprocessor operating system, the processor having a plurality of thread contexts each comprising storage elements that describe a state of execution of a respective plurality of threads running on the respective plurality of thread contexts. The method includes a first thread running on a first thread context writing to a second thread context to cause a second thread running on the second thread context to stop running. The method also includes the first thread writing to the second thread context an address of an exception handler of the operating system. The method also includes the first thread writing to the second thread context to cause the exception handler to commence running at the address on the second thread context.

In another aspect, the present invention provides a multiprocessor computer system. The system includes a microprocessor. The microprocessor includes at least first and second thread contexts. Each thread context includes a restart register and a control register. The control register controls whether the thread context is halted from execution. The system also includes a memory, coupled to the microprocessor, for storing a first thread of execution for execution on the first thread context. The system also includes a multiprocessing operating system (MP OS), stored in the memory. The MT OS includes a second thread of execution for execution on the second thread context. The second thread writes to the control register of the first thread context to halt execution of the first thread, writes to the restart register of the first thread context an address of an exception handler of the MP OS, and writes to the control register of the first thread context to commence execution of the exception handler on the first thread context at the address.

In another aspect, the present invention provides a computer program product for use with a computing device, the computer program product including a computer usable medium, having computer readable program code embodied in the medium, for causing a method for performing software emulation of a directed exception in a multithreading processor running a multiprocessor operating system, the processor having a plurality of thread contexts each comprising storage elements that describe a state of execution of a respective plurality of threads running on the respective plurality of thread contexts. The computer readable program code includes first program code for providing a step of a first thread running on a first thread context writing to a second thread context to cause a second thread running on the second thread context to stop running. The computer readable program code also includes second program code for providing a step of the first thread writing to the second thread context an address of an exception handler of the operating system. The computer readable program code also includes third program code for providing a step of the first thread writing to the second thread context to cause the exception handler to commence running at the address on the second thread context.

In another aspect, the present invention provides a method for providing operating system software for performing emulation of a directed exception in a multithreading processor running a multiprocessor operating system, the processor having a plurality of thread contexts each comprising storage elements that describe a state of execution of a respective plurality of threads running on the respective plurality of thread contexts. The method includes providing computer-readable program code describing a multiprocessor computer system. The program code includes first program code for providing a step of a first thread running on a first thread context writing to a second thread context to cause a second thread running on the second thread context to stop running. The program code also includes second program code for providing a step of the first thread writing to the second thread context an address of an exception handler of the operating system. The program code also includes third program code for providing a step of the first thread writing to the second thread context to cause the exception handler to commence running at the address on the second thread context. The method also includes transmitting the computer-readable program code as a computer data signal on a network.

An advantage of the present invention is that it enables SMP operating systems to enjoy the benefits of running on a multithreading processor that comprises lightweight thread contexts, which makes the multithreading processor more scalable to a relatively large number of logical processors if needed. In particular, it eliminates the need for an interrupt controller for each thread context (e.g., a pending interrupt register and interrupt mask register and associated control for each thread context); rather, these elements may be implemented on a higher level, such as at the VPE level in the MIPS MT ASE, thereby saving chip area and power. Furthermore, it enables an SMP operating system to execute on a microprocessor with potentially many CPUs (i.e., thread contexts), which may yield substantially higher performance than a microprocessor with a relatively small number of CPUs due to the exploitation of thread-level parallelism, and yet avoid the additional chip area and power consumption that would otherwise be required if the per-VPE state were replicated for each thread context. Finally, the invention may be incorporated into existing SMP operating systems with a relatively small amount of modification to the operating system.

BRIEF DESCRIPTION OF THE DRAWINGS

FIG. 4 is a block diagram illustrating an MTTR instruction executed by the microprocessor of FIG. 1 according to the present invention.

FIG. 5 is a series of block diagrams illustrating various multithreading-related registers of the microprocessor of FIG. 1 according to one embodiment of the present invention.

DETAILED DESCRIPTION

For a better understanding of exception processing on MIPS architecture processors in general, the reader is referred to *MIPS RISC Architecture*, by Gerry Kane and Joe Heinrich, published by Prentice Hall, and to *See MIPS Run*, by Dominic Sweetman, published by Morgan Kaufman Publishers.

Embodiments of the present invention are described herein in the context of a processor core that includes the MIPS® MT Application-Specific Extension (ASE) to the MIPS32® Architecture; however, the present invention is not limited to a processor core with said architecture. Rather, the present invention may be implemented in any processor system which includes a plurality of thread contexts for concurrently executing a corresponding plurality of threads, but which does not include an interrupt input for each of the plurality of thread contexts that would allow one thread context to direct an inter-processor interrupt specifically to another thread context.

Figure 1:
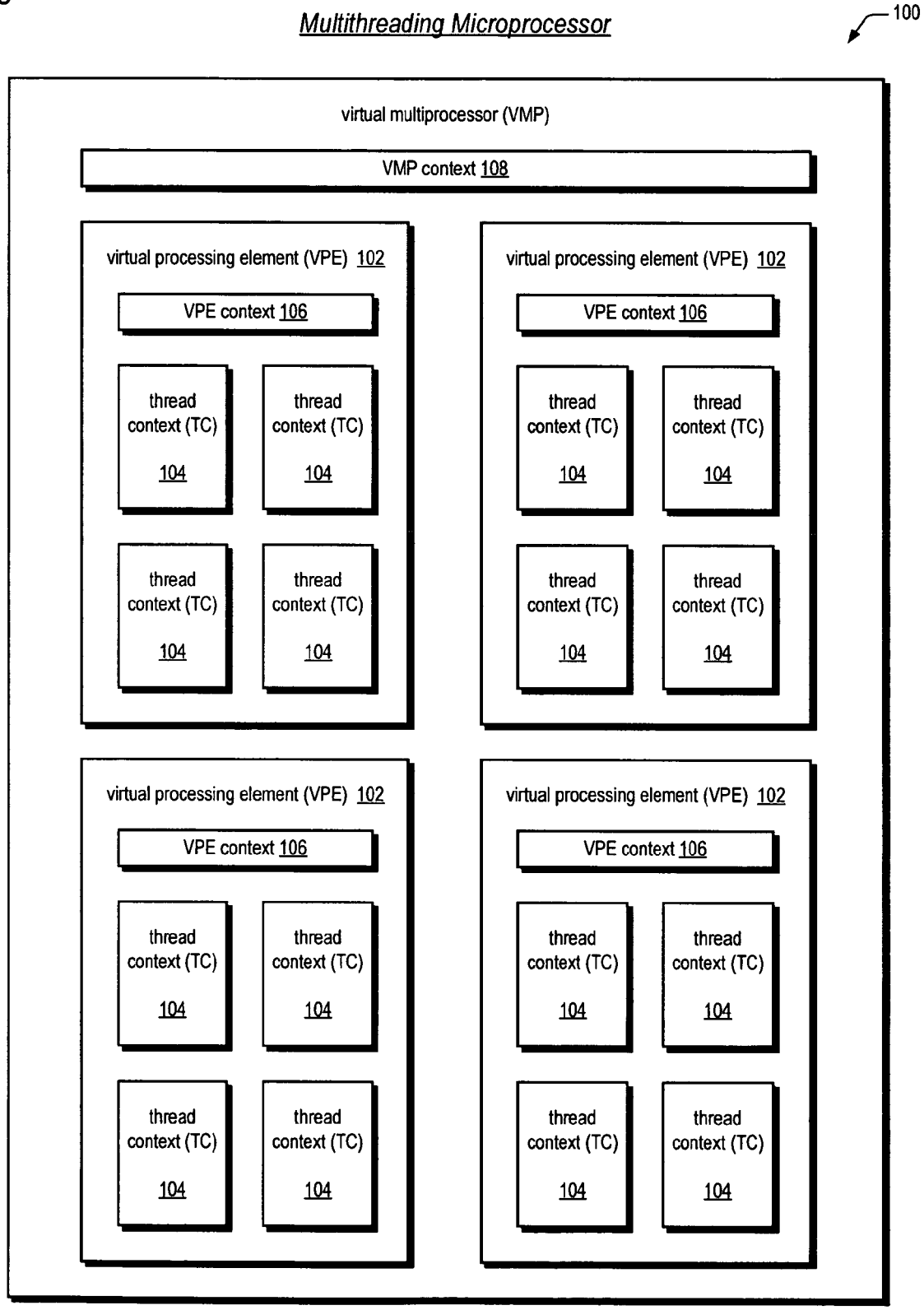
FIG. 1 is a block diagram illustrating a microprocessor according to the present invention.

Referring now to FIG. 1, a block diagram illustrating a microprocessor 100 according to the present invention is shown. The microprocessor 100 includes a virtual multiprocessor (VMP) context 108 and a plurality of virtual processing elements (VPEs) 102. Each VPE 102 includes a VPE context 106 and at least one thread context (TC) 104. The VMP context 108 comprises a collection of storage elements, such as registers or latches, and/or bits in the storage elements of the microprocessor 100 that describe the state of execution of the microprocessor 100. In particular, the VMP context 108 stores state related to global resources of the microprocessor 100 that are shared among the VPEs 102, such as the instruction cache 202, instruction fetcher 204, instruction decoder 206, instruction issuer 208, instruction scheduler 216, execution units 212, and data cache 242 of FIG. 2, or other shared elements of the microprocessor 100 pipeline described below. In one embodiment, the VMP context 108 includes the MVPControl Register 501, MVPConf0 Register 502, and MvPConf1 Register 503 of FIGS. 5B-5D described below.

A thread context 104 comprises a collection of storage elements, such as registers or latches, and/or bits in the storage elements of the microprocessor 100 that describe the state of execution of a thread, and which enable an operating system to manage the resources of the thread context 104. That is, the thread context describes the state of its respective thread, which is unique to the thread, rather than state shared with other threads of execution executing concurrently on the microprocessor 100. A thread—also referred to herein as a thread of execution, or instruction stream—is a sequence of instructions. The microprocessor 100 is a multithreading microprocessor. That is, the microprocessor 100 is configured to concurrently execute multiple threads of execution. By storing the state of each thread in the multiple thread contexts 104, the microprocessor 100 is configured to quickly switch between threads to fetch and issue instructions. The elements of a thread context 104 of various embodiments are described below with respect to the remaining Figures. Advantageously, the present microprocessor 100 is configured to execute the MFTR instruction 300 of FIG. 3 and the MTTR instruction 400 of FIG. 4 for moving thread context 104 information between the various thread contexts 104, as described in detail herein.

The VPE context 106 includes a collection of storage elements, such as registers or latches, and/or bits in the storage elements of the microprocessor 100 that describe the state of execution of a VPE 102, which enable an operating system to manage the resources of the VPE 102, such as virtual memory, caches, exceptions, and other configuration and status information. Consequently, a microprocessor 100 with N VPEs 102 may appear to an operating system as an N-way symmetric multiprocessor. However, as also described herein, a microprocessor 100 with M thread contexts 104 may appear to an operating system as an M-way symmetric multiprocessor. In particular, threads running on the thread contexts 104 may include MFTR instructions 300 and MTTR instructions 400 to read and write another thread context 104 to emulate a directed exception, such as an inter-processor interrupt, as described herein.

Figure 2:
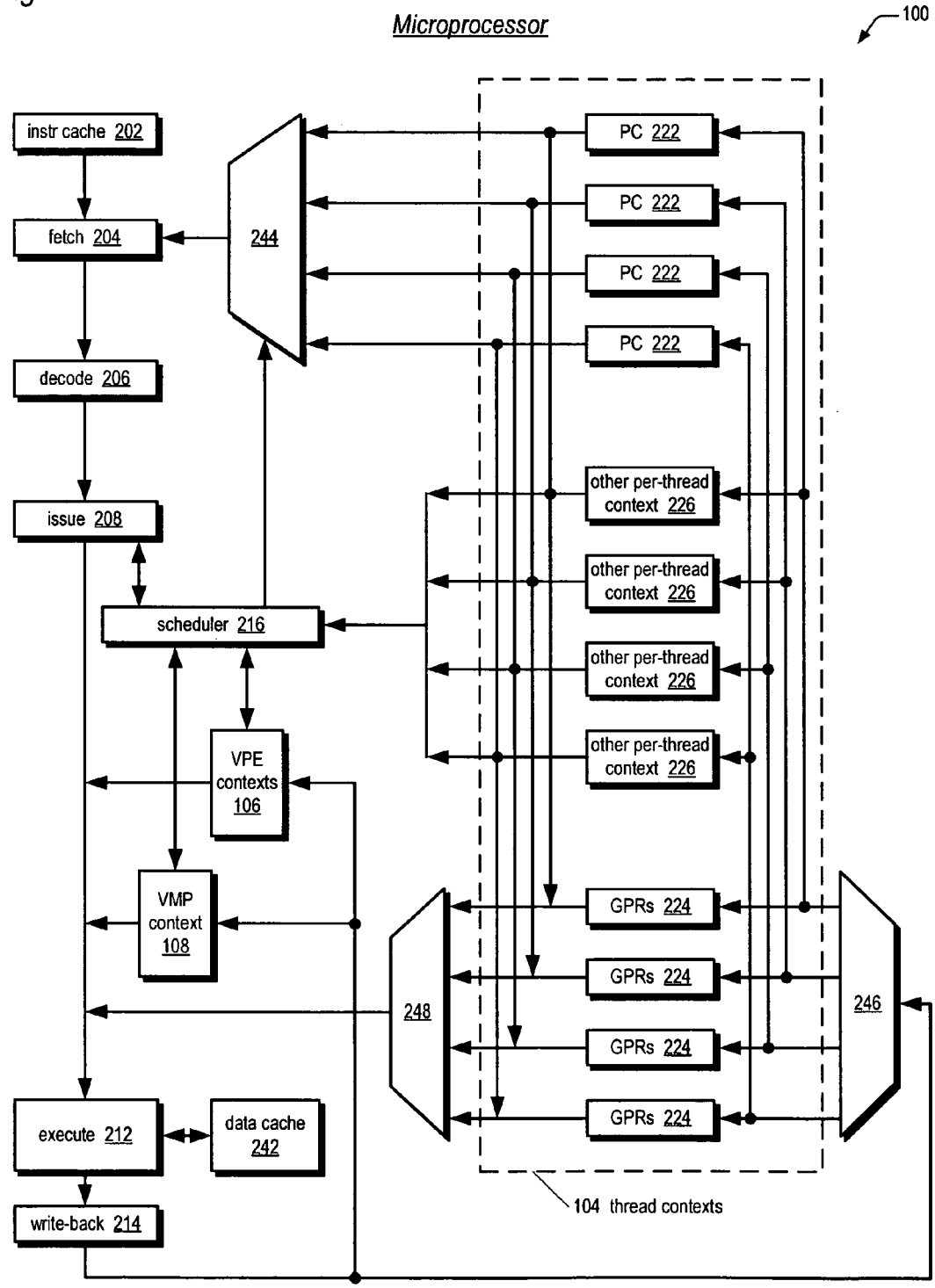
FIG. 2 is a block diagram illustrating in more detail the microprocessor of FIG. 1.

The VPEs 102 share various of the microprocessor 100 resources, such as the instruction cache 202, instruction fetcher 204, instruction decoder 206, instruction issuer 208, instruction scheduler 216, execution units 212, and data cache 242 of FIG. 2, transparently to the operating system. In one embodiment, each VPE 102 substantially conforms to a MIPS32 or MIPS64 Instruction Set Architecture (ISA) and a MIPS Privileged Resource Architecture (PRA), and the VPE context 106 includes the MIPS PRA Coprocessor 0 and system state necessary to describe one or more instantiations thereof. In one embodiment, the VPE context 106 includes the VPEControl Register 504, VPEConf0 Register 505, VPEConf1 Register 506, YQMask Register 591, VPESchedule Register 592, and VPEScheFBack Register 593 of FIGS. 5E-5H and EPC Register 598 of FIG. 5L and Status Register 571 of FIG. 5M described below.

In one respect, a VPE 102 may be viewed as an exception domain. That is, when an asynchronous exception (such as a hardware or software interrupt) is generated, or when an instruction of one of the thread contexts 104 of a VPE 102 generates a synchronous exception (such as an address error, bus error, or invalid instruction exception), multithreading is suspended on the VPE 102 (i.e., only instructions of the instruction stream associated with the thread context 104 servicing the exception are fetched and issued), and each VPE context 106 includes the state necessary to service the exception. Once the exception is serviced, the exception handler may selectively re-enable multithreading on the VPE 102. When an asynchronous exception such as an interrupt is raised to the VPE 102, the VPE 102 selects one of the eligible (i.e., not marked as exempt from servicing asynchronous exceptions as indicated by the IXMT bit 518 of FIG. 5J) thread contexts 104 of the VPE 102 to execute the exception handler. (The manner used by the VPE 102 to select one of the eligible thread contexts is implementation-dependent, such as selecting pseudo-randomly, in a round-robin fashion, or based on the relative priorities of the thread contexts 104.) That is, the asynchronous exception itself does not specify which thread context 104 of the VPE 102 is to handle the exception. Thus, the microprocessor 100 does not provide a hardware exception mechanism for one thread context 104 to direct an asynchronous exception to another specific thread context 104. Advantageously, the present invention provides a method for operating system software to emulate one thread context 104 directing an asynchronous exception to another specific thread context 104, as described herein.

Referring now to FIG. 2, a block diagram illustrating in more detail the microprocessor 100 of FIG. 1 is shown. The microprocessor 100 is a pipelined microprocessor comprising a plurality of pipeline stages. The microprocessor 100 includes a plurality of thread contexts 104 of FIG. 1. The embodiment of FIG. 2 shows four thread contexts 104; however, it should be understood that the number of four thread contexts 104 is chosen only for illustration purposes, and the microprocessor 100 described herein embodying the present invention is susceptible to any number of thread contexts 104. In one embodiment, the number of thread contexts 104 may be up to 256. Furthermore, a microprocessor 100 may include multiple VPEs 102, each having multiple thread contexts 104. In one embodiment, each thread context 104 comprises a program counter (PC) 222 for storing an address for fetching a next instruction in the associated instruction stream, a general purpose register (GPR) set 224 for storing intermediate execution results of the instruction stream issuing from the thread context based on the program counter 222 value, and other per-thread context 226. In one embodiment, the microprocessor 100 includes a multiplier unit, and the other thread context 226 includes registers for storing results of the multiplier unit specifically associated with multiply instructions in the instruction stream. In one embodiment, the other thread context 226 includes information for uniquely identifying each thread context 104. In one embodiment, the thread identification information includes information for specifying the execution privilege level of the associated thread, such as whether the thread is a kernel, supervisor, or user level thread, such as is stored in the TKSU bits 589 of the TCStatus Register 508 of FIG. 5J. In one embodiment, the thread identification information includes information for identifying a task or process comprising the thread. In particular, the task identification information may be used as an address space identifier (ASID) for purposes of translating physical addresses into virtual addresses, such as is stored in the TASID bits 528 of the TCStatus Register 508. In one embodiment, the other per-thread context 226 includes the TCStatus Register 508, TCRestart Register 594, TCHalt Register 509, TCContext Register 595, TCSchedule Register 596, TCBind Register 556 and TCScheFBack Register 597 of FIGS. 5J-5L.

The microprocessor 100 includes a scheduler 216 for scheduling execution of the various threads being concurrently executed by the microprocessor 100. The scheduler 216 is coupled to the VMP context 108 and VPE contexts 106 of FIG. 1 and to the other per-thread context 226. In particular, the scheduler 216 is responsible for scheduling fetching of instructions from the program counter 222 of the various thread contexts 104 and for scheduling issuing of the fetched instructions to execution units 212 of the microprocessor 100, as described below. The scheduler 216 schedules execution of the threads based on a scheduling policy of the microprocessor 100. The scheduling policy may include, but is not limited to, any of the following scheduling policies. In one embodiment, the scheduler 216 employs a round-robin, or time-division-multiplexed, or interleaved, scheduling policy that allocates a predetermined number of clock cycles or instruction issue slots to each ready thread in a rotating order. The round-robin policy is useful in an application in which fairness is important and a minimum quality of service is required for certain threads, such as real-time application program threads. In one embodiment, the scheduler 216 employs a blocking scheduling policy wherein the scheduler 216 continues to schedule fetching and issuing of a currently running thread until an event occurs that blocks further progress of the thread, such as a cache miss, a branch misprediction, a data dependency, or a long latency instruction. In one embodiment, the microprocessor 100 comprises a superscalar pipelined microprocessor, and the scheduler 216 schedules the issue of multiple instructions per clock cycle, and in particular, the issue of instructions from multiple threads per clock cycle, commonly referred to as simultaneous multithreading.

The microprocessor 100 includes an instruction cache 202 for caching program instructions fetched from a system memory of a system including the microprocessor 100, such as the MFTR/MTTR 300/400 instructions. In one embodiment, the microprocessor 100 provides virtual memory capability, and the fetch unit 204 includes a translation lookaside buffer for caching physical to virtual memory page translations. In one embodiment, each thread, or program, or task, executing on the microprocessor 100 is assigned a unique task ID, or address space ID (ASID), which is used to perform memory accesses and in particular memory address translations, and a thread context 104 also includes storage for an ASID associated with the thread. In one embodiment, the various threads executing on the microprocessor 100 share the instruction cache 202 and translation lookaside buffer. In another embodiment, each thread includes its own translation lookaside buffer.

The microprocessor 100 also includes a fetch unit 204, coupled to the instruction cache 202, for fetching program instructions, such as MFTR/MTTR 300/400 instructions, from the instruction cache 202 and system memory. The fetch unit 204 fetches instructions at an instruction fetch address provided by a multiplexer 244. The multiplexer 244 receives a plurality of instruction fetch addresses from the corresponding plurality of program counters 222. Each of the program counters 222 stores a current instruction fetch address for a different program thread. The embodiment of FIG. 2 illustrates four different program counters 222 associated with four different threads. The multiplexer 244 selects one of the four program counters 222 based on a selection input provided by the scheduler 216. In one embodiment, the various threads executing on the microprocessor 100 share the fetch unit 204.

The microprocessor 100 also includes a decode unit 206, coupled to the fetch unit 204, for decoding program instructions fetched by the fetch unit 204, such as MFTR/MTTR 300/400 instructions. The decode unit 206 decodes the opcode, operand, and other fields of the instructions. In one embodiment, the various threads executing on the microprocessor 100 share the decode unit 206.

The microprocessor 100 also includes execution units 212 for executing instructions. The execution units 212 may include but are not limited to one or more integer units for performing integer arithmetic, Boolean operations, shift operations, rotate operations, and the like; floating point units for performing floating point operations; load/store units for performing memory accesses and in particular accesses to a data cache 242 coupled to the execution units 212; and a branch resolution unit for resolving the outcome and target address of branch instructions. In one embodiment, the data cache 242 includes a translation lookaside buffer for caching physical to virtual memory page translations. In addition to the operands received from the data cache 242, the execution units 212 also receive operands from registers of the general purpose register sets 224. In particular, an execution unit 212 receives operands from a register set 224 of the thread context 104 allocated to the thread to which the instruction belongs. A multiplexer 248 selects operands from the appropriate register set 224 for provision to the execution units 212. In addition, the multiplexer 248 receives data from each of the other per-thread contexts 226 and program counters 222, for selective provision to the execution units 212 based on the thread context 104 of the instruction being executed by the execution unit 212. In one embodiment, the various execution units 212 may concurrently execute instructions from multiple concurrent threads.

The microprocessor 100 also includes an instruction issue unit 208, coupled to the scheduler 216 and coupled between the decode unit 206 and the execution units 212, for issuing instructions to the execution units 212 as instructed by the scheduler 216 and in response to information about the instructions decoded by the decode unit 206. In particular, the instruction issue unit 208 insures that instructions are not issued to the execution units 212 if they have data dependencies on other instructions previously issued to the execution units 212. In one embodiment, an instruction queue is imposed between the decode unit 206 and the instruction issue unit 208 for buffering instructions awaiting issue to the execution units 212 for reducing the likelihood of starvation of the execution units 212. In one embodiment, the various threads executing on the microprocessor 100 share the instruction issue unit 208.

The microprocessor 100 also includes a write-back unit 214, coupled to the execution units 212, for writing back results of instructions into the general purpose register sets 224, program counters 222, and other thread contexts 226. A demultiplexer 246 receives the instruction result from the write-back unit 214 and stores the instruction result into the appropriate register set 224, program counters 222, and other thread contexts 226 associated with the instruction's thread. The instruction results are also provided for storage into the VPE contexts 106 and the VMP context 108.

Figure 3A:
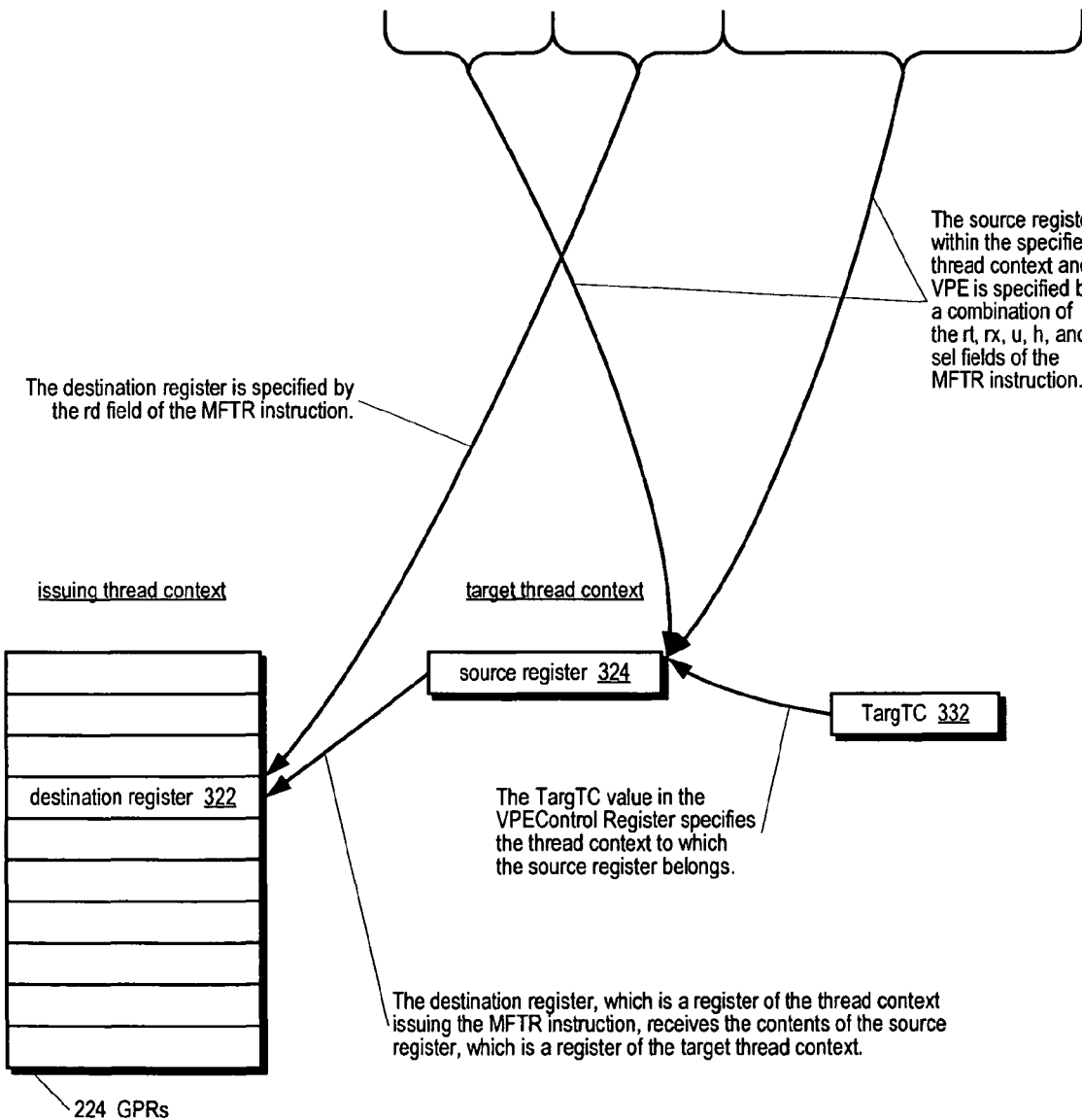
FIG. 3 is a block diagram illustrating an MFTR instruction executed by the microprocessor of FIG. 1 according to the present invention.

Referring now to FIG. 3, a block diagram illustrating an MFTR instruction 300 executed by the microprocessor 100 of FIG. 1 according to the present invention is shown. FIG. 3 comprises FIG. 3A illustrating the format and function of the MFTR instruction 300, and FIG. 3B illustrating a table 350 specifying selection of the MFTR instruction 300 source register 324 based on its operand values. The mnemonic for the MFTR instruction 300 is MFTR rt, rd, u, sel, h as shown. As shown in FIG. 3, the MFTR instruction 300 instructs the microprocessor 100 to copy the contents of a source register 324 of a target thread context 104 to a destination register 322 of an issuing thread context 104.

Bits 11-15 are an rd field 308, which specifies an rd register 322, or destination register 322, within the general purpose register set 224 of FIG. 2 of the thread context 104 from which the MFTR instruction 300 is issued, referred to herein as the issuing thread context. In one embodiment, the destination register 322 is one of 32 general purpose registers of the MIPS ISA.

Bits 16-20, 6-10, 5, 4, and 0-2 are an rt field 306, rx field 312, u field 314, h field 316, and sel field 318, respectively, which collectively are used to specify a source register 324 of a thread context 104 distinct from the issuing thread context, referred to herein as the target thread context 104. The use of the rt field 306, rx field 312, u field 314, h field 316, and sel field 318 to specify the source register 324 is described in detail in table 350 of FIG. 3B.

Figure 6:
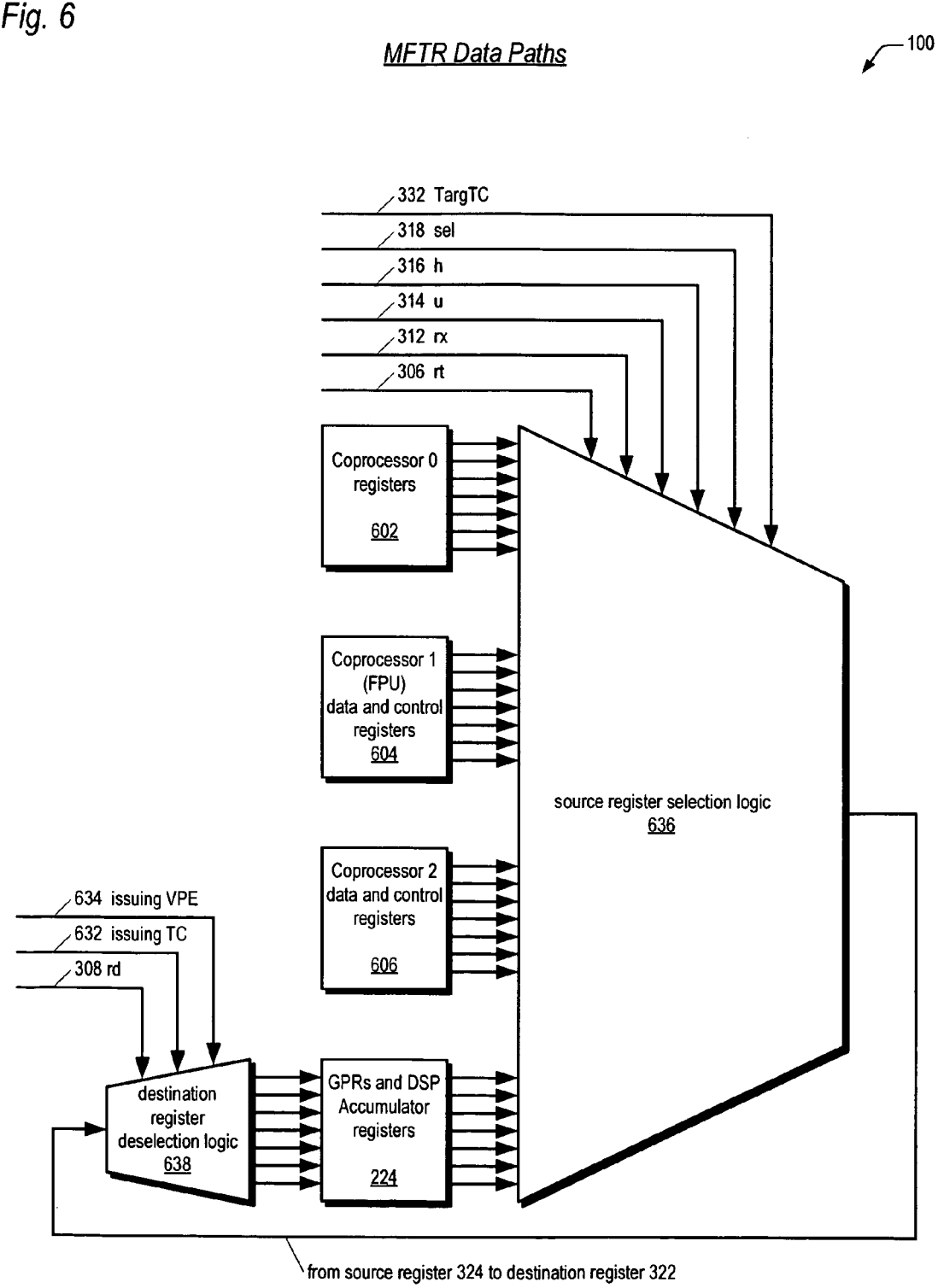
FIG. 6 is a block diagram illustrating data paths of the microprocessor for performing the MFTR instruction according to the present invention.
Figure 8:
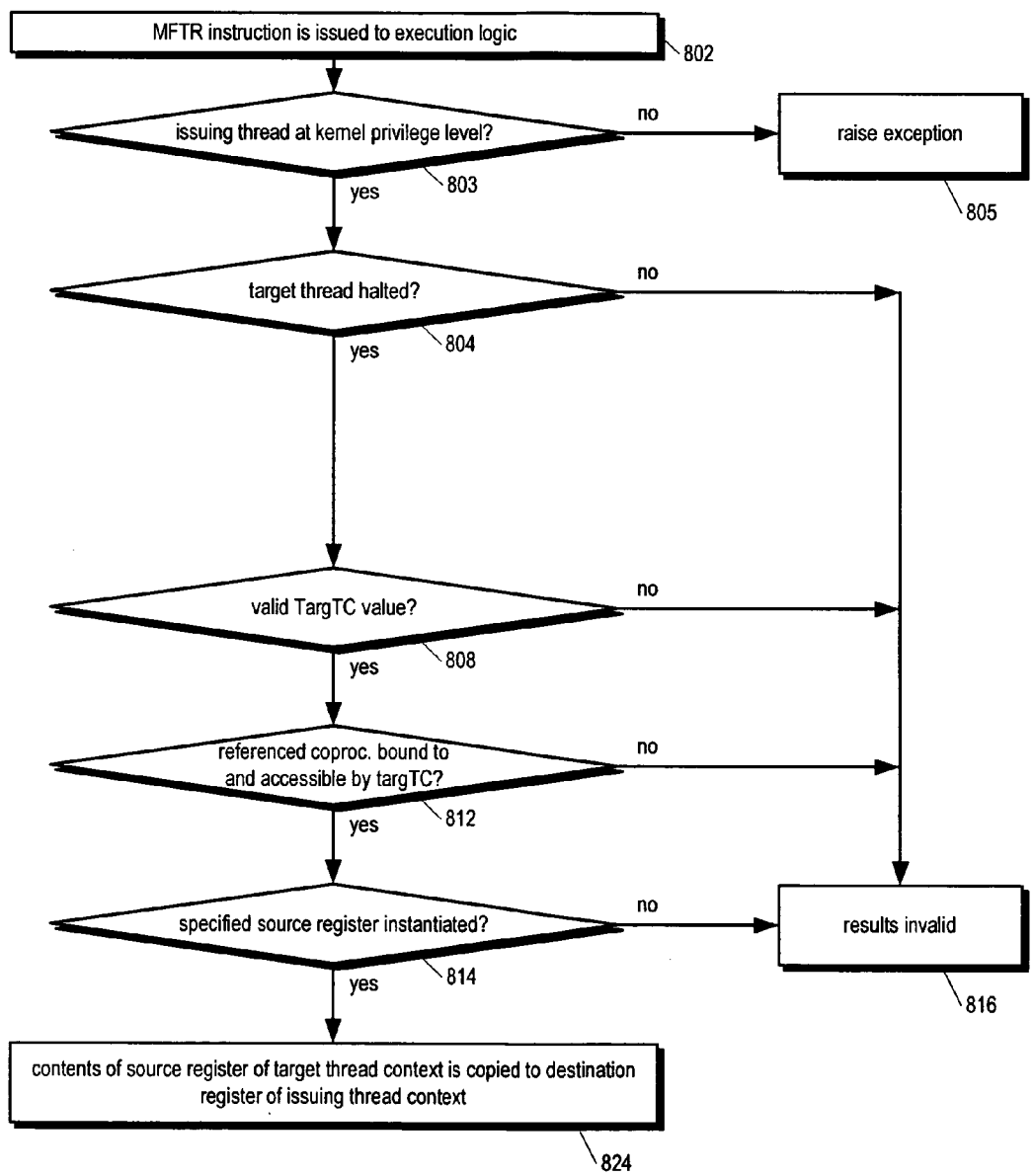
FIG. 8 is a flowchart illustrating operation of the microprocessor to execute the MFTR instruction according to the present invention.

In one embodiment, the microprocessor 100 includes one or more processor control coprocessors, referred to in the MIPS PRA as Coprocessor 0, or CP0, or Cop0, denoted 602 in FIGS. 6 and 8, which is generally used to perform various microprocessor 100 configuration and control functions, such as cache control, exception control, memory management unit control, and particularly multithreading control and configuration. As shown in Table 350, a u field 314 value of 0 selects one of the CP0 registers as the MFTR instruction 300 source register 324. Table 500 of FIG. 5A illustrates the particular rt field 306 (or rd 308 in the case of MTTR 400) and sel field 318 values used to select the various multithreading-related CP0 registers. In one embodiment, as shown in Table 350, a u field 314 value of 1 and a sel field 318 value of 0 selects one of the general purpose registers 224 of FIG. 2, selected by the rt field 306 value, as the MFTR instruction 300 source register 324. In one embodiment, the microprocessor 100 includes a digital signal processor (DSP) arithmetic unit or multiplier for performing common DSP-related arithmetic operations, and each thread context 104 includes four accumulators for storing the TC-specific results of the arithmetic operations and a DSPControl register of the DSP accumulators, denoted 224 in FIGS. 6 and 8. A u field 314 value of 1 and a sel field 318 value of 1 selects as the MFTR instruction 300 source register 324 one of the DSP accumulator registers or the DSPControl register, selected by the rt field 306 value, as shown. In one embodiment, the microprocessor 100 includes one or more floating point or multimedia coprocessors, referred to in the MIPS PRA as Coprocessor 1, or CP1, or Cop1, denoted 604 in FIGS. 6 and 8. As shown in Table 350, a u field 314 value of 1 and a sel field 318 value of 2 selects as the MFTR instruction 300 source register 324 one of the floating point unit data registers (FPR) selected by the rt field 306 value; furthermore, a sel field 318 value of 3 selects as the MFTR instruction 300 source register 324 one of the floating point unit control registers (FPCR) selected by the rt field 306 value. In one embodiment, the microprocessor 100 includes one or more implementation-specific coprocessors, referred to in the MIPS PRA as Coprocessor 2, or CP2, or Cop2, denoted 606 in FIGS. 6 and 8. As shown in Table 350, a u field 314 value of 1 and a sel field 318 value of 4 selects as the MFTR instruction 300 source register 324 one of the CP2 data registers (Cop2 Data) selected by the concatenation of the rx field 312 value and the rt field 306 value; furthermore, a sel field 318 value of 5 selects as the MFTR instruction 300 source register 324 one of the CP2 control registers (Cop2 Control) selected by the concatenation of the rx field 312 value and the rt field 306 value.

The source register 324 is further specified by a TargTC operand 332. The TargTC 332 operand specifies the target thread context 104 containing the source register 324. In one embodiment, the TargTC operand 332 is stored in the VPE-Control Register 504 of FIG. 5E. If the source register 324 is a per-VPE 102 register, the source register 324 is of the VPE 102 to which the target thread context 104 is bound, as specified by the CurVPE field 558 of the TCBind Register 556 of FIG. 5K.

Referring now to FIG. 4, a block diagram illustrating an MTTR instruction 400 executed by the microprocessor 100 of FIG. 1 according to the present invention is shown. FIG. 4 comprises FIG. 4A illustrating the format and function of the MTTR instruction 400, and FIG. 4B illustrating a table 450 specifying selection of the MTTR instruction 400 destination register 422 based on its operand values. The various fields of the MTTR instruction 400 are identical to the fields of the MFTR instruction 300, except that the value of the sub-opcode field 404 is different, and the use of the rt field 306 and rd field 308 is reversed, i.e., the rt field 306 is used by the MTTR instruction 400 to select the source register 424 and the rd field 308 is used—along with the rx 312, u 314, h 316, and sel 318 fields—to select the destination register 422 within the thread context 104 specified by the TargTC 332 operand, as shown in FIG. 4. As shown in FIG. 4, the MTTR instruction 400 instructs the microprocessor 100 to copy the contents of a source register 424 of the issuing thread context 104 to a destination register 424 of the target thread context 104.

Referring now to FIG. 5, a series of block diagrams illustrating various multithreading-related registers of the microprocessor 100 of FIG. 1 according to one embodiment of the present invention is shown. FIG. 5 comprises FIG. 5A-5M. In one embodiment, the registers of FIG. 5 are comprised in CP0 602 of FIGS. 6 and 8, and FIG. 5A is a table 500 indicating the particular rt field 306 (or rd 308 in the case of MTTR 400) and sel field 318 values used to select the various multithreading-related CP0 registers 602. As indicated in table 500, some of the registers are included in the VMP context 108 of FIG. 1 (i.e., are per-microprocessor 100 registers), some of the registers are included in the VPE contexts 106 of FIG. 1 (i.e., are per-VPE 102 registers), and some of the registers are included in the thread contexts 104 of FIG. 1 (i.e., are per-thread context 104 registers). Most of FIGS. 5B-5M include an illustration of the fields of each of the multithreading registers and a table describing the various fields. Fields of particular relevance are discussed in more detail herein. Each of the registers illustrated in FIG. 5 of one thread context (i.e., the target thread context 104) may be selectively read and/or written by another thread context 104 (i.e., the issuing thread context 104) that executes an MFTR 300 or MTTR 400 instruction, respectively, depending upon the readability or writeability of the particular register or bits thereof.

The EVP bit 513 of FIG. 5B controls whether the microprocessor 100 is executing as a virtual multiprocessor, i.e., if multiple VPEs 102 may concurrently fetch and issue instructions from distinct threads of execution. The PVPE field 524 of FIG. 5C specifies the total number of VPEs 102, i.e., the total number of VPE contexts 106, instantiated in the microprocessor 100. In the embodiment of FIG. 5, up to sixteen VPEs 102 may be instantiated in the microprocessor 100. The PTC field 525 of FIG. 5C specifies the total number of thread contexts 104 instantiated in the microprocessor 100. In the embodiment of FIG. 5, up to 256 thread contexts 104 may be instantiated in the microprocessor 100. The TE bit 543 of FIG. 5E controls whether multithreading is enabled or disabled within a VPE 102. In one embodiment, the effect of clearing the EVP bit 513 and TE bit 543 may not be instantaneous; consequently the operating system should execute a hazard barrier instruction to insure that all VPEs 102 and thread contexts 104, respectively, have been quiesced.

As discussed above, TargTC field 332 of FIG. 5E is used by an issuing thread context 104 to specify the thread context 104 that contains the source register 324 in the case of an MFTR instruction 300 or the destination register 422 in the case of an MTTR instruction 400. In one embodiment, the issuing thread context 104 executes an instruction prior to the MFTR/MTTR instruction 300/400 to populate the TargTC 332 field of the VPEControl Register 504. In one embodiment, a single TargTC 332 value per VPE 102 is sufficient since multithreading must be disabled on the VPE 102 issuing the MFTR/MTTR 300/400 instruction; hence, none of the other thread contexts 104 of the VPE 102 may be using the TargTC 332 field of the VPEControl Register 504 of the issuing VPE 102. In an alternate embodiment, the TargTC 332 value may be provided within a field of the MFTR/MTTR 300/400 instructions. The TargTC field 332 is used to specify the target thread context 104 independent of the VPE 102 to which the target thread context 104 is bound. Each thread context 104 in the microprocessor 100 has a unique number, or identifier, specified in the CurTC field 557 of the TCBind Register 556 of FIG. 5K, with values 0 through N−1, where N is the number of instantiated thread contexts 104, and N may be up to 256. If the target register (source register 324 of an MFTR instruction 300, or destination register 422 of an MTTR instruction 400) is a per-TC register, then the target register is in the thread context 104 specified by the TargTC 332 value; if the target register is a per-VPE register, then the target register is in the VPE 102 to which the thread context 104 specified in the TargTC 332 is bound.

The TCU0 . . . TCU3 bits 581 of the TCStatus Register 508 of FIG. 5J control and indicate whether the thread context 104 controls access to its VPE's 102 Coprocessor 0, 1, 2, or 3, respectively. The TCU0 . . . TCU3 bits 581 and TKSU bits 589 of the TCStatus Register 508 correspond to the CU0 . . . CU3 bits 572 and the KSU bits 574, respectively, of the Status Register 571 of FIG. 5M; and the TASID bits 528 of the TCStatus Register 508 correspond to the ASID bits of the Coprocessor 0 EntryHi register described in the MIPS32® Architecture for Programmers Volume III: The MIPS32® Privileged Resource Architecture, Document Number: MD00090, Revision 2.50, Jul. 1, 2005, available from MIPS Technologies, 1225 Charleston Road, Mountain View, Calif. 94043-1353. In particular, each time the bits are written in one of the registers, the corresponding change is reflected by a read of the other register. For example, if a new value is written to the TKSU bits 589, the new value may be read from the KSU bits 574 of the Status Register 571, and vice versa.

The TCContext Register 595 of FIG. 5L is a read/write register usable by the operating system as a pointer to a thread context-specific storage area in memory, such as a thread context control block. The TCContext Register 595 may be used by the operating system, for example, to save and restore state of a thread context 104 when the program thread associated with the thread context 104 must be swapped out for use by another program thread.

The RNST bits 582 of the TCStatus Register 508 indicate the state of the thread context 104, namely whether the thread context 104 is running or blocked, and if blocked the reason for blockage. The RNST 582 value is only stable when read by an MFTR instruction 300 if the target thread context 104 is in a halted state, which is described below; otherwise, the RNST 582 value may change asynchronously and unpredictably. When a thread context 104 is in the running state, the microprocessor 100 will fetch and issue instructions from the thread of execution specified by the thread context 104 program counter 222 according to the scheduler 216 scheduling policy.

Independently of whether a thread context 104 is free or activated, a thread context 104 may be halted if the H bit 599 of the TCHalt Register 509 of FIG. 5K is set. That is, a first thread context 104 running an operating system thread may halt a second thread context 104 by writing a 1 to the H bit 599 of the TCHalt Register 509 of the second thread context 104. A free thread context 104 has no valid content and the microprocessor 100 does not schedule instructions of a free thread context 104 to be fetched or issued. The microprocessor 100 schedules instructions of an activated thread context 104 to be fetched and issued from the activated thread context 104 program counter 222. The microprocessor 100 schedules only activated thread contexts 104. The microprocessor 100 allows the operating system to allocate only free thread contexts 104 to create new threads. Setting the H bit 599 of an activated thread context 104 causes the thread context 104 to cease fetching instructions and to load its restart address 549 into the TCRestart register 594 of FIG. 5K with the address of the next instruction to be issued for the thread context 104. Only a thread context 104 in a halted state is guaranteed to be stable as seen by other thread contexts 104, i.e., when examined by an MFTR instruction 300. Multithreaded execution may be temporarily inhibited on a VPE 102 due to exceptions or explicit software interventions, but activated thread contexts 104 that are inhibited in such cases are considered to be suspended, rather than implicitly halted. A suspended thread context 104 is inhibited from any action which might cause exceptions or otherwise change global VPE 102 privileged resource state, but unlike a halted thread, a suspended thread context 104 may still have instructions active in the pipeline; consequently, the suspended thread context 104, including general purpose registers 224 values, may still be unstable; therefore, the thread context 104 should not be examined by an MFTR instruction 300 until the thread context 104 is halted. In one embodiment, the effect of clearing the H bit 599 may not be instantaneous; consequently the operating system should execute a hazard barrier instruction to insure that the target thread context has been quiesced.

When a thread context 104 is in a halted state, the TCRestart Register 594 may be read to obtain the address 549 of the instruction at which the microprocessor 100 will resume execution of the thread context 104 when the thread context 104 is restarted. In the case of branch and jump instructions with architectural branch delay slots, the restart address 549 will advance beyond the address of the branch or jump instruction only after the instruction in the delay slot has been retired. If the thread context 104 is halted between the execution of a branch instruction and the associated delay slot instruction, the branch delay slot is indicated by the TDS bit 584 of the TCStatus Register 508.

Conversely, the TCRestart register 594 can be written while its thread context 104 is halted to change the address at which the thread context 104 will restart. Furthermore, a first thread context 104 running an operating system thread may restart a second thread context 104 by writing a 0 to the H bit 599 of the TCHalt Register 509 of the second thread context 104. Clearing the H bit 599 of an activated thread context 104 allows the thread context 104 to be scheduled, and begin fetching and executing instructions at its restart address 549 specified in its TCRestart register 594.

In the MIPS PRA, the Coprocessor 0 EPC Register 598 of FIG. 5L contains the address at which the exception servicing thread context 104 will resume execution after an exception has been serviced and the thread context 104 executes an ERET (exception return) instruction. That is, when the thread running on the thread context 104 executes an ERET instruction, the VPE 102 reads the EPC Register 598 to determine the address at which to begin fetching and issuing instructions. Unless the EXL bit 576 of the Status Register 571 of FIG. 5M is already set, the microprocessor 100 writes the EPC Register 598 when an exception is raised. For synchronous exceptions, the microprocessor 100 writes the address of the instruction that was the direct cause of the exception, or the address of the immediately preceding branch or jump instruction, if the exception-causing instruction is in a branch delay slot. For asynchronous exceptions, the microprocessor 100 writes the address of the instruction at which execution will be resumed.

In a MIPS MT ASE microprocessor 100, the EPC Register 598 is instantiated for each VPE 102 in the microprocessor 100. When an exception is raised to a VPE 102, the VPE 102 selects one of its thread contexts 104 to service the exception. All thread contexts 104 of the VPE 102, other than the thread context 104 selected to service the exception, are stopped and suspended until the EXL bit 576 and ERL bit 575 of the Status Register 571 are cleared. When a synchronous exception is raised due to the execution of an instruction contained in a thread of execution, the microprocessor 100 selects the thread context 104 running the thread containing the offending instruction to service the exception. That is, the general purpose registers 224, program counter 222, and other per-thread context 226 of the offending thread context 104 are used to service the synchronous exception. When an asynchronous exception is raised, such as an interrupt, the microprocessor 100 selects one of the eligible thread contexts 104 bound to the VPE 102 to service the asynchronous exception. The VPE 102 to which a thread context 104 is bound (as indicated by the CurVPE field 558 of the TCBind Register 556) is the exception domain for the thread context 104. In particular, a VPE 102 selects a thread context 104 bound to it, i.e., within its exception domain, to service an exception. Additionally, a thread context 104 utilizes the resources related to handling exceptions (such as the Coprocessor 0 EPC Register 598 and Status Register 571) of the exception domain, or VPE 102, to which the thread context 104 is bound when servicing an exception. The method for choosing the eligible thread context 104 to service an asynchronous exception is implementation-dependent and may be adapted to satisfy the particular application in which the microprocessor 100 is employed. However, as discussed herein, the MIPS MT ASE does not provide the capability for the asynchronous exception to specify which of the thread contexts 104 must service the asynchronous exception. The microprocessor 100 saves the restart address of the thread context 104 selected to service the exception in the EPC Register 598 of the VPE 102 to which the selected thread context 104 is bound. Additionally, a thread context 104 may be made ineligible for being selected to service an asynchronous exception by setting the IXMT bit 518 in its TCStatus Register 508.

In one embodiment, the program counter 222 of FIG. 2 is not an architecturally-visible register, but is affected indirectly by various events and instructions. Effectively, the program counter 222 is a virtual program counter represented by various storage elements within the microprocessor 100 pipeline, and the meaning or value of the program counter 222 depends upon the context in which it is examined or updated. For example, as a thread context 104 fetches instructions from the instruction cache 202, the program counter 222 value is the address at which the instructions are being fetched. Thus, in this context the storage element storing the current fetch address may be viewed as the program counter 222. For another example, when an exception is taken and the VPE 102 selects a thread context 104 to service the exception, the address written by the VPE 102 to the EPC Register 598 may be viewed as the program counter 222 value of the selected thread context 104 in this situation since when the selected thread context 104 executes an ERET instruction, fetching for the thread context 104 begins at the EPC Register 598 value. For another example, the TCRestart register 594 of a thread context 104 may be viewed as the program counter 222 when a thread context 104 is halted since when the thread context 104 is unhalted, fetching for the thread context 104 begins at the TCRestart register 594 value.

The Coprocessor 0 Status Register 571 of FIG. 5M is instantiated for each VPE 102 in the microprocessor 100. Only certain fields of the Status Register 571 are described herein. For a more detailed description of the other bits in the Status Register 571, the reader is referred to the document MIPS32® Architecture for Programmers Volume III: The MIPS32® Privileged Resource Architecture, Document Number: MD00090, Revision 2.50, Jul. 1, 2005, which is hereby incorporated by reference in its entirety for all purposes. As discussed above, the CU0 . . . CU3 bits 572 and the KSU bits 574 correspond to the TCU0 . . . TCU3 bits 581 and TKSU bits 589, respectively, of the TCStatus Register 508 of FIG. 5J. The ERL bit 575 is set by the microprocessor 100 hardware whenever a Reset, Soft Reset, NMI, or Cache Error exception is taken. The EXL bit 576 is set by the microprocessor 100 hardware whenever any other exception is taken. When ERL 575 or EXL 576 is set, the VPE 102 is running in kernel mode with interrupts disabled. When the IE bit 577 is set, all interrupts for the VPE 102 are disabled.

Referring now to FIG. 6, a block diagram illustrating data paths of the microprocessor 100 for performing the MFTR instruction 300 according to the present invention is shown. The microprocessor 100 includes selection logic 636 that receives the contents of each of the registers of Coprocessor 0 602, Coprocessor 1 604, Coprocessor 2 606, and the general purpose and DSP accumulator registers 224 of FIG. 2 and selects the source register 324 contents, which is one of the register contents from the target thread context 104, for provision to deselection logic 638 based on values of the rt 306 operand, the rx 312 operand, the u 314 operand, the h 316 operand, and the sel 318 operand of the MFTR instruction 300, as well as the TargTC 332 operand. The deselection logic 638 receives the source register 324 contents selected by the selection logic 636 and writes the selected contents into the destination register 322, which is one of the general purpose registers 224 of the issuing thread context 104, based on the value of the rd 308 operand of the MFTR instruction 300, as well as signals 632 and 634 indicating the issuing VPE 102 and issuing thread context 104, respectively.

Figure 7:
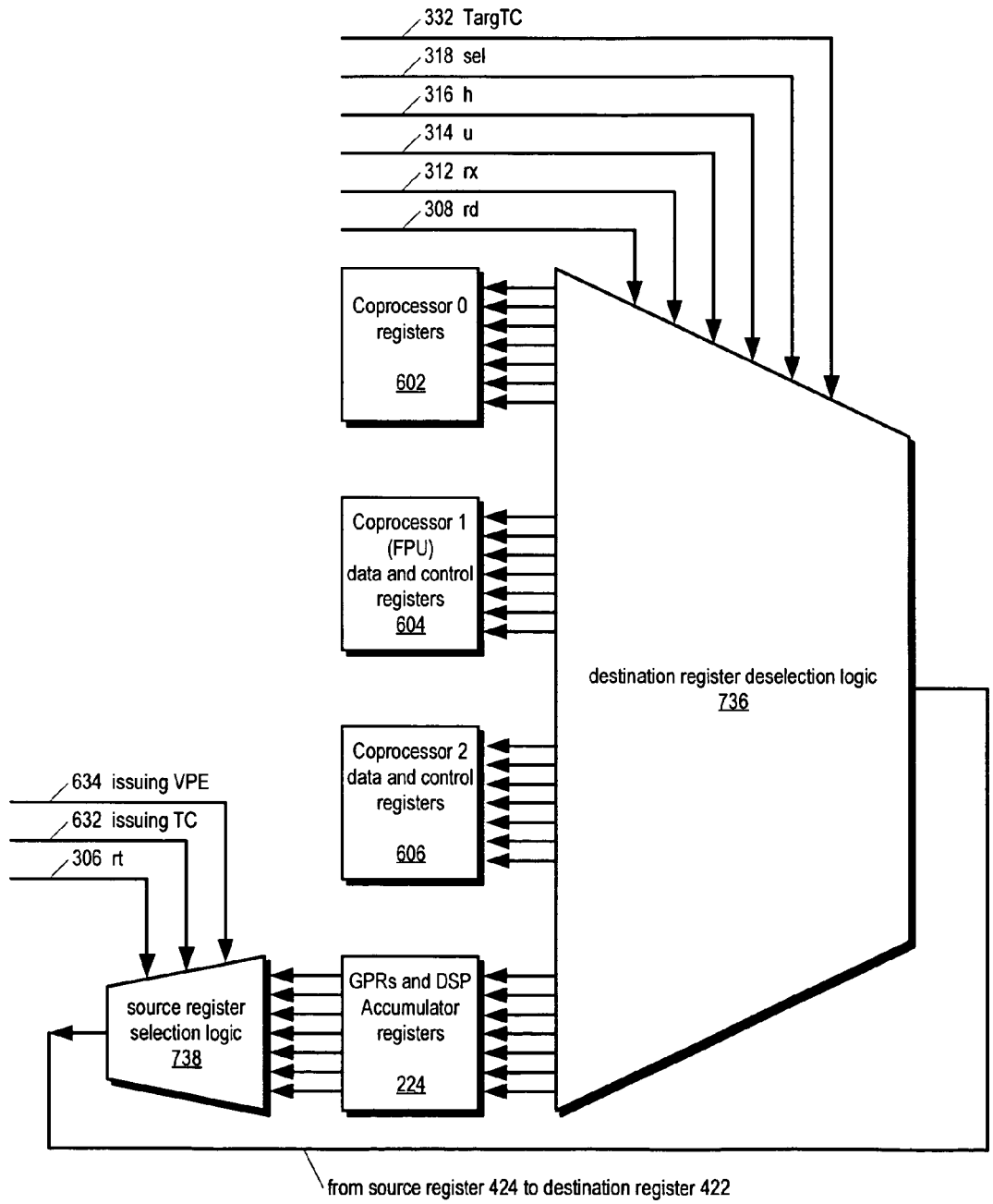
FIG. 7 is a block diagram illustrating data paths of the microprocessor for performing the MTTR instruction according to the present invention.

Referring now to FIG. 7, a block diagram illustrating data paths of the microprocessor 100 for performing the MTTR instruction 400 according to the present invention is shown. The microprocessor 100 includes selection logic 738 that receives the contents of each of the general purpose registers 224 of the issuing thread context 104 and selects the source register 424, which is one of the register contents from the issuing thread context 104, for provision to deselection logic 736 based on the value of the rt 306 operand of the MTTR instruction 400, as well as signals 632 and 634 indicating the issuing VPE 102 and issuing thread context 104, respectively. The deselection logic 736 receives the source register 424 contents selected by the selection logic 738 and writes the selected contents into the destination register 422, which is one of the registers of Coprocessor 0 602, Coprocessor 1 604, Coprocessor 2 606, or the general purpose and DSP accumulator registers 224 of FIG. 2, based on values of the rd 308 operand, the rx 312 operand, the u 314 operand, the h 316 operand, and the sel 318 operand of the MTTR instruction 400, as well as the TargTC 332 operand. In one embodiment, the selection and de-selection logic of FIGS. 6 and 7 may comprise a hierarchy of multiplexers, demultiplexers, data buses, and control logic for generating a plurality of bank and register selectors to control the multiplexers and demultiplexers for selecting the appropriate values from the specified register for provision on the data buses. In one embodiment, the data paths may also include intermediate registers for storing the values transferred between the issuing and target thread contexts over multiple clock cycles.

Referring now to FIG. 8, a flowchart illustrating operation of the microprocessor 100 to execute the MFTR instruction 300 according to the present invention is shown. Flow begins at block 802.

At block 802, the instruction issuer 208 of FIG. 2 issues an MFTR instruction 300 to the execution units 212. Flow proceeds to decision block 803.

At decision block 803, the execution unit 212 examines the TKSU bits 589 of the TCStatus Register 508 to determine whether the privilege level of the issuing thread context 104 is at kernel privilege level. If so, flow proceeds to decision block 804; otherwise, flow proceeds to block 805.

At block 805, the execution unit 212 raises an exception to the MFTR instruction 300 since the issuing thread context 104 does not have sufficient privilege level to execute the MFTR instruction 300. Flow ends at block 805.

At decision block 804, the execution unit 212 determines whether the target thread context 104 is halted by examining the value of the H bit 599 of the TCHalt Register 509 of FIG. 5K. If the target thread context 104 is halted, flow proceeds to decision block 808; otherwise flow proceeds to block 816.

At decision block 808, the execution unit 212 examines the TargTC 332 value of the issuing VPE 102 VPEControl Register 504 to determine whether the TargTC 332 value is valid. In one embodiment, the TargTC 332 value is not valid if the issuing VPE is not the master VPE 102, as indicated by a clear value in the MVP bit 553 of the VPEConf0 Register 505 of FIG. 5F. In one embodiment, the TargTC 332 value is not valid if the thread context 104 specified by TargTC 332 is not instantiated. If the TargTC 332 value is valid, flow proceeds to decision block 812; otherwise, flow proceeds to block 816.

At decision block 812, the execution unit 212 examines the TCU bits 581 in the TCStatus Register 508 of FIG. 5J to determine whether the MFTR instruction 300 references a coprocessor, and if so, whether the coprocessor is bound to and accessible by the target thread context 104 specified by the TargTC 332 value. If the MFTR instruction 300 references a coprocessor, and the coprocessor is not bound to and accessible by the target thread context 104 specified by the TargTC 332 value, flow proceeds to block 816; otherwise, flow proceeds to decision block 814.

At decision block 814, the execution unit 212 determines whether the source register 324 specified by the MFTR instruction 300 is instantiated. If so, flow proceeds to block 824; otherwise, flow proceeds to block 816.

At block 816, the results of the MFTR instruction 300 are invalid. That is, the microprocessor 100 attempts to perform block 824; however, the source, destination, and values of the data transfer are invalid. Flow ends at block 816.

At block 824, the execution unit 212 copies the contents of the source register 324 of the target thread context 104 to the destination register 322 of the issuing thread context 104. In one embodiment, the microprocessor 100, after reading the source register 324, updates the source register 324 with an update value. In one embodiment, the read/update is performed atomically. In one embodiment, the update value is provided in the GPR 224 specified by the rd field 308 in the MFTR instruction 300. Flow ends at block 824.

Figure 9:
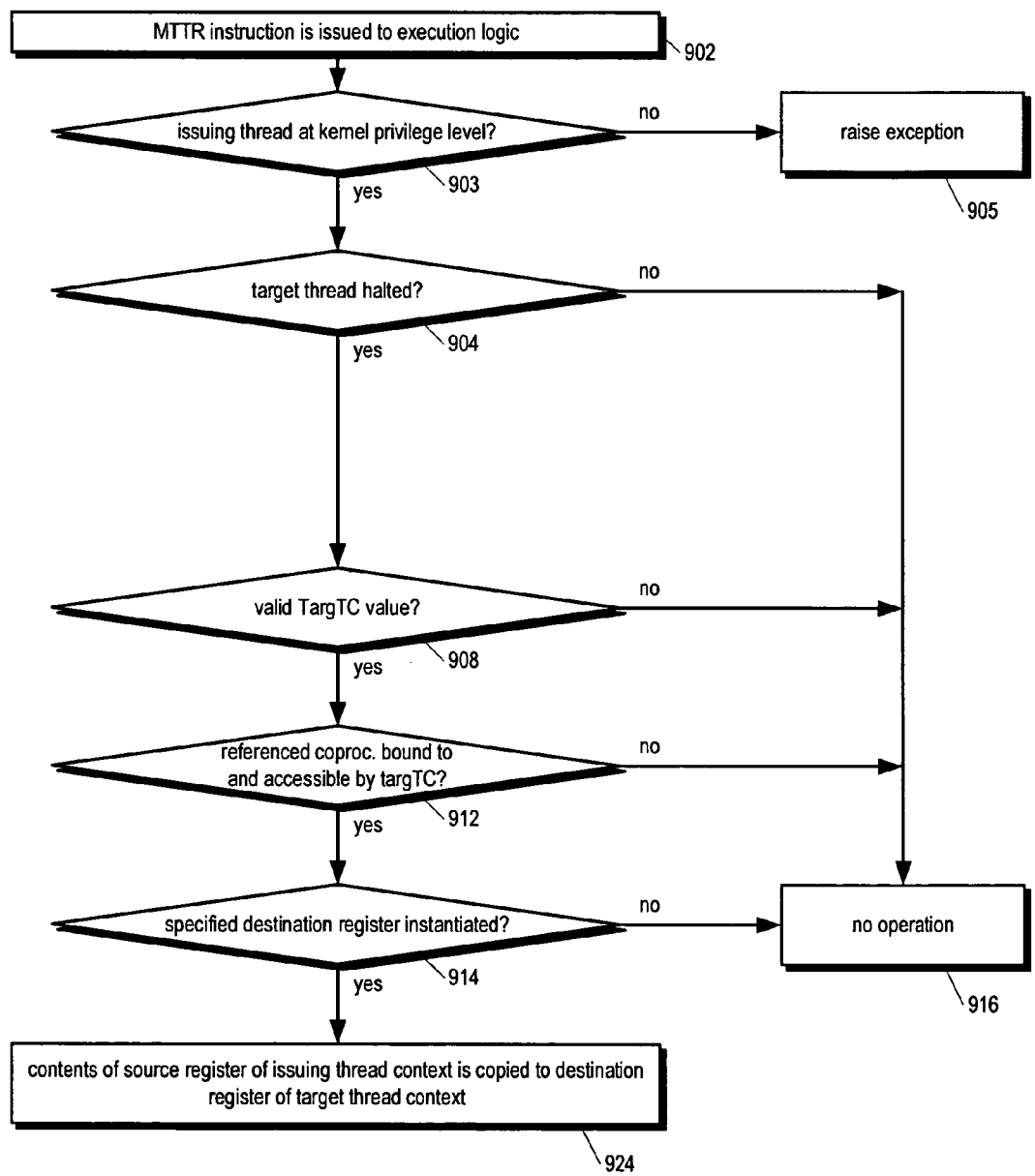
FIG. 9 is a flowchart illustrating operation of the microprocessor to execute the MTTR instruction according to the present invention.

Referring now to FIG. 9, a flowchart illustrating operation of the microprocessor 100 to execute the MTTR instruction 400 according to the present invention is shown. Flow begins a block 902.

At block 902, the instruction issuer 208 of FIG. 2 issues an MTTR instruction 400 to the execution units 212. Flow proceeds to decision block 903.

At decision block 903, the execution unit 212 examines the TKSU bits 589 of the TCStatus Register 508 to determine whether the privilege level of the issuing thread context 104 is at kernel privilege level. If so, flow proceeds to decision block 904; otherwise, flow proceeds to block 905.

At block 905, the execution unit 212 raises an exception to the MTTR instruction 400 since the issuing thread context 104 does not have sufficient privilege level to execute the MTTR instruction 400. Flow ends at block 905.

At decision block 904, the execution unit 212 determines whether the target thread context 104 is halted by examining the value of the H bit 599 of the TCHalt Register 509 of FIG. 5K. If the target thread context 104 is halted, flow proceeds to decision block 908; otherwise flow proceeds to block 916.

At decision block 908, the execution unit 212 examines the TargTC 332 value of the issuing VPE 102 VPEControl Register 504 to determine whether the TargTC 332 value is valid. In one embodiment, the TargTC 332 value is not valid if the issuing VPE is not the master VPE 102, as indicated by a clear value in the MVP bit 553 of the VPEConf0 Register 505 of FIG. 5F. In one embodiment, the TargTC 332 value is not valid if the thread context 104 specified by TargTC 332 is not instantiated. If the TargTC 332 value is valid, flow proceeds to decision block 912; otherwise, flow proceeds to block 916.

At decision block 912, the execution unit 212 examines the TCU bits 581 in the TCStatus Register 508 of FIG. 5J to determine whether the MTTR instruction 400 references a coprocessor, and if so, whether the coprocessor is bound to and accessible by the target thread context 104 specified by the TargTC 332 value. If the MTTR instruction 400 references a coprocessor, and the coprocessor is not bound to and accessible by the target thread context 104 specified by the TargTC 332 value, flow proceeds to block 916; otherwise, flow proceeds to decision block 914.

At decision block 914, the execution unit 212 determines whether the destination register 422 specified by the MTTR instruction 400 is instantiated. If so, flow proceeds to block 924; otherwise, flow proceeds to block 916.

At block 916, the microprocessor 100 performs no operation because there is no valid destination register to which the source data may be written. Flow ends at block 916.

At block 924, the execution unit 212 copies the contents of the source register 424 of the issuing thread context 104 to the destination register 422 of the target thread context 104. Flow ends at block 924.

Figure 10:
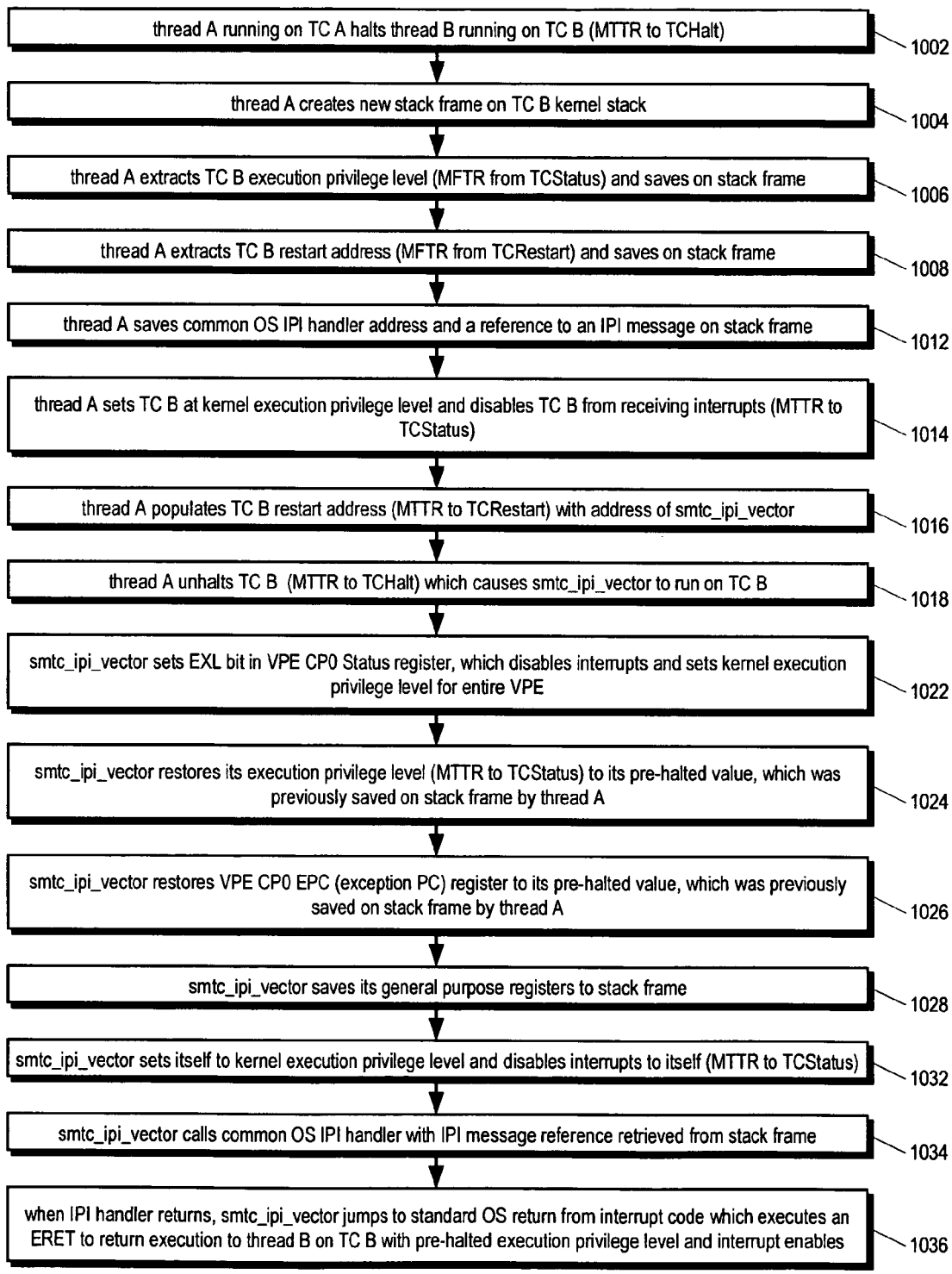
FIG. 10 is a flowchart illustrating a method for performing an inter-processor interrupt (IPI) from one thread context to another thread context within a VPE of the microprocessor of FIG. 1 according to the present invention.

Referring now to FIG. 10, a flowchart illustrating a method for performing an inter-processor interrupt (IPI) from one thread context 104 to another thread context 104 within a VPE 102 of the microprocessor 100 of FIG. 1 according to the present invention is shown. The steps of the flowchart substantially correlate to the source code listing at the end of the Detailed Description, and reference is made within the description of FIG. 10 to the source code listing. The source code listing is for a version of the Linux SMP operating system modified to view each thread context 104 of the microprocessor 100 as a separate processor, or CPU, which is referred to herein as symmetric multi-thread context (SMTC) Linux. The source code listing includes two C language functions (smtc_send_ipi and post_direct_ipi), one assembly language routine (smtc_ipi_vector), and one assembly language macro (CLI).

Within the flowchart, reference is made to a thread A running on a thread context A 104 and a thread B running on a thread context B 104. Thread A running on thread context A 104 directs a software-emulated inter-processor interrupt (IPI) to thread context B 104, by employing MFTR instructions 300 and MTTR instructions 400. In the example of the flowchart, thread context A 104 and thread context B 104 are bound to the same VPE 102. Although the flowchart of FIG. 10 illustrates only an intra-VPE IPI, the source code listing also includes instructions at lines 23-28 for directing a cross-VPE IPI, or inter-VPE IPI. A first thread context 104 is said to direct an inter-VPE IPI to a second thread context 104 if the second thread context 104 is bound to a different VPE 102 than the first thread context 104. The code performs an inter-VPE IPI by placing an IPI message on a queue associated with the target thread context 104. The message specifies the target thread context 104. In the embodiment described in the source code at lines 23-28, the message specified the target thread context 104 implicitly by being on the queue associated with the target thread context 104. The operating system samples the queue and drains it each time the operating system performs a context switch and returns from exception. After queuing the message, the code issues a MIPS PRA asynchronous software interrupt to the target VPE 102 (i.e., to the VPE 102 to which the target thread context 104 is bound) by executing an MTTR instruction 400 (within the write_vpe_c0_cause routine) to set one of the software interrupt bits in the MIPS PRA Cause Register of the target VPE 102, which will cause the queue to be sampled and drained. If the thread context 104 selected by the target VPE 102 to service the software interrupt is the target of the IPI, then the selected thread context 104 will service the IPI directly; otherwise, the selected thread context 104 will direct an intra-VPE IPI to the target thread context 104 in a manner similar to the operation described in the flowchart of FIG. 10.

As described above, when an asynchronous hardware interrupt (such as a periodic timer interrupt used for operating system task scheduling purposes) is requested in a MIPS MT ASE processor, the VPE 102 that received the hardware interrupt request selects an eligible thread context (in this example, thread context A 104) to handle the exception. In the MIPS architecture, when a hardware interrupt request is made, control is transferred to a general exception vector of the operating system. The general exception vector decodes the cause of the exception and invokes the appropriate interrupt request handler (in this example, thread A), such as the timer handler.

The Linux SMP kernel for the MIPS architecture assumes that every processor, or CPU, in the SMP system will get a periodic interrupt, and divides the work performed by the timer interrupt handler into a local clock interrupt function that executes on all CPUs, and a system clock interrupt function that executes only on one CPU of the SMP system. In the MIPS processor architecture, each VPE 102 includes one timer in Coprocessor 0 shared by all thread contexts 104 bound to the VPE 102 (see the Count/Compare register pairs described in MIPS32® Architecture for Programmers Volume III: The MIPS32® Privileged Resource Architecture, Document Number: MD00090, Revision 2.50, Jul. 1, 2005). In one embodiment of SMTC Linux, only one of the timers of one of the VPEs 102 is invoked as the single timer for all CPUs of the SMP system. In another embodiment, the timer of each of the VPEs 102 is invoked for all CPUs of that VPE 102. The thread context 104 selected to service the asynchronous timer interrupt executes the system clock interrupt function and then broadcasts, or directs, an IPI to all the other thread contexts 104 of the VPE 102. The directed IPI is a local clock interrupt type IPI which instructs the receiving thread contexts 104 to execute only the local clock interrupt function. Although the SMTC Linux timer interrupt handler directs an IPI message to each thread context 104 known to the operating system as a processor, the flowchart of FIG. 10 only illustrates directing an IPI to one thread context 104, which is thread context B 104 in this example. The operation of the microprocessor 100 in response to a timer interrupt to perform preemptive task scheduling is described in more detail in FIG. 11. Flow begins at block 1002.

At block 1002, at source code line 38, thread A running on thread context A 104 halts thread B running on thread context B 104 by executing an MTTR instruction 400 instruction to clear the H bit 599 of the TCHalt Register 509 of FIG. 5K. It is noted that the C language function write_tc_c0_tchalt includes the MTTR instruction 400. The function settc at line 36 populates the TargTC field 332 of the VPEControl Register 504 of FIG. 5E with the thread context 104 identifier of the specified thread context 104 (in the example, thread context B 104) for the benefit of the MTTR instruction 400 of the write_tc_c0_tchalt function. Flow proceeds to block 1004.

At block 1004, at lines 95-100 (via the call the post_direct_ipi at line 64), thread A creates a new stack frame on the kernel stack of thread context B 104. In one embodiment, the new stack frame is effectively created by the assignment of a value to the kernel stack pointer of thread context B 104, and storing values on the new stack frame comprises storing values at predetermined offsets from the kernel stack pointer value. It is also noted that if the target thread context 104 is exempted from taking interrupts (as indicated by a set IXMT bit 518 of FIG. 5J), the code cannot spin waiting for the target thread context 104 to become non-exempted from taking interrupts because this may lead to a deadlock condition. Therefore, the code places the IPI message on the target thread context's 104 queue at lines 48-62, in a manner similar to the inter-VPE IPI issued at line 24; however, in this case no inter-VPE 102 software interrupt is necessary. Flow proceeds to block 1006.

At block 1006, at line 82, thread A reads the TCStatus Register 508 of thread context B 104 via the function read_tc_c0_tcstatus, which includes an MFTR instruction 300. The TCStatus Register 508 includes the thread context B 104 execution privilege level and interrupt exemption status, among other things. Thread A, at line 104, also saves the TCStatus Register 508 value to the stack frame created at block 1004. Flow proceeds to block 1008.

At block 1008, at line 83, thread A reads the restart address 549 of thread B from TCRestart register 594 of thread context B 104 via the function read_tc_c0_tcrestart, which includes an MFTR instruction 300. Thread A, at line 102, also saves the restart address 549 to the stack frame created at block 1004. Flow proceeds to block 1012.

At block 1012, at lines 106 and 108, thread A saves the address of the operating system IPI handler and a reference to an IPI message on the stack frame created at block 1004. In the embodiment of the source code listing, advantageously, the code manipulates the target thread context B 104 and stack frame such that a common IPI handler may be invoked to support SMTC operation. The common IPI handler is invoked to handle both software emulated interrupts described herein and actual hardware interrupts, i.e., interrupts for which target thread context 104 B is the thread context 104 selected by the VPE 102 to handle the hardware interrupt request, such as may be invoked at block 1114 of FIG. 11. Flow proceeds to block 1014.

At block 1014, at lines 110-112, thread A writes the TCStatus Register 508 of thread context B 104 via the function the function write_tc_c0_tcstatus, which includes an MTTR instruction 400, to set the execution privilege level of thread context B 104 to kernel mode and disables, or exempts, thread context B 104 from receiving interrupts. Conceptually, thread A would set the EXL bit 576 in Coprocessor 0 Status Register 571 in order to emulate an exception. However, when EXL 576 is set, multithreading is disables on the VPE 102, i.e., only one thread context 104 is allowed to run when EXL 576 is set. And thread A needs thread context B 104 to run when un-halted below at block 1018. Therefore, the setting of EXL 576 must be left up to thread context B 104 by smtc_ipi_vector at block 1022 below. Thus, until then, thread A temporarily accomplishes a similar effect to setting EXL 576 by setting IXMT 518 and TKSU 589 to kernel mode in the thread context B 104 TCStatus Register 508. Flow proceeds to block 1016.

At block 1016, at line 115, thread A writes the restart address 549 of thread B in the TCRestart register 594 of thread context B 104 via the function the function write_tc_c0_tcrestart, which includes an MTTR instruction 400, with the address of smtc_ipi_vector. Flow proceeds to block 1018.

At block 1018, at line 65, thread A un-halts, or restarts, thread context B 104 to cause smtc_ipi_vector to begin running on thread context B 104. Flow proceeds to block 1022.

At block 1022, at lines 163-165, the smtc_ipi_vector sets EXL 576, which has the effect of disabling interrupts and setting the execution privilege level to kernel mode for all thread contexts 104 bound to the VPE 102. It is noted that at line 160 the smtc_ipi_vector disables multithreading on the VPE 102 before setting EXL 576. Additionally, if multithreading was enabled prior to line 160, the code restores multithreading at lines 168-170. It is also noted that if thread context B 104 was in user mode when halted at block 1002, the smtc_ipi_vector sets the CU0 bit 572 of the Status Register 571. Flow proceeds to block 1024.

At block 1024, at lines 196 and 198, the smtc_ipi_vector restores the thread context B 104 pre-halted TCStatus Register 508 value that was saved at block 1006, and in particular restores its execution privilege level and interrupt exemption state. Flow proceeds to block 1026.

At block 1026, at lines 200-201, the smtc_ipi_vector loads the EPC Register 598 with the thread context B 104 pre-halted TCRestart register 594 value saved at block 1008. Consequently, when the standard Linux SMP return from interrupt code subsequently executes an ERET instruction at block 1036, thread B will be restarted on thread context B 104 at the address at which it was halted at block 1002. Thus, by setting EXL 576 at block 1022 and populating the EPC Register 598 at block 1026, the smtc_ipi_vector effectively emulates what the microprocessor 100 hardware would do if thread context B 104 had been selected to service the asynchronous interrupt (rather than thread context A 104). Flow proceeds to block 1028.

At block 1028, at line 203, the smtc_ipi_vector saves all of the general purpose registers 224 to the stack frame created at block 1004. Flow proceeds to block 1032.

At block 1032, at line 204 via the CLI macro, the smtc_ipi_vector sets itself to kernel mode execution privilege level and exempts itself from servicing interrupts. It is noted that this is performed only for thread context B 104, not for the entire VPE 102. It is noted that the CLI macro is a standard Linux macro which is modified to support SMTC by setting kernel mode execution privilege level and exempting from interrupt servicing (via the IXMT bit 518) only the invoking thread context 104, rather than the entire VPE 102 (as the non-SMTC code does by clearing the IE bit 577 of the Status Register 571 of FIG. 5M), as shown at lines 227-247. Flow proceeds to block 1034.

At block 1034, at lines 205-210, the smtc_ipi_vector calls the common IPI handler (which is ipi_decode, as populated at line 108) with the IPI message reference saved on the stack frame at block 1012 as an argument. Flow proceeds to block 1036.

At block 1036, at line 212, after the operating system IPI handler returns, the smtc_ipi_vector jumps to the standard operating system return from interrupt code (which in Linux SMP is ret_from_irq), which eventually executes an ERET instruction to return execution on thread context B 104 to thread B with its pre-halted execution privilege level and interrupt exemption state. Prior to executing the ERET instruction, the return from interrupt code restores the EPC Register 598 with the restart address value saved at block 1008 and restores the Status Register 571 KSU bits 574 with the value saved at block 1006. Flow ends at block 1036.

Figure 11:
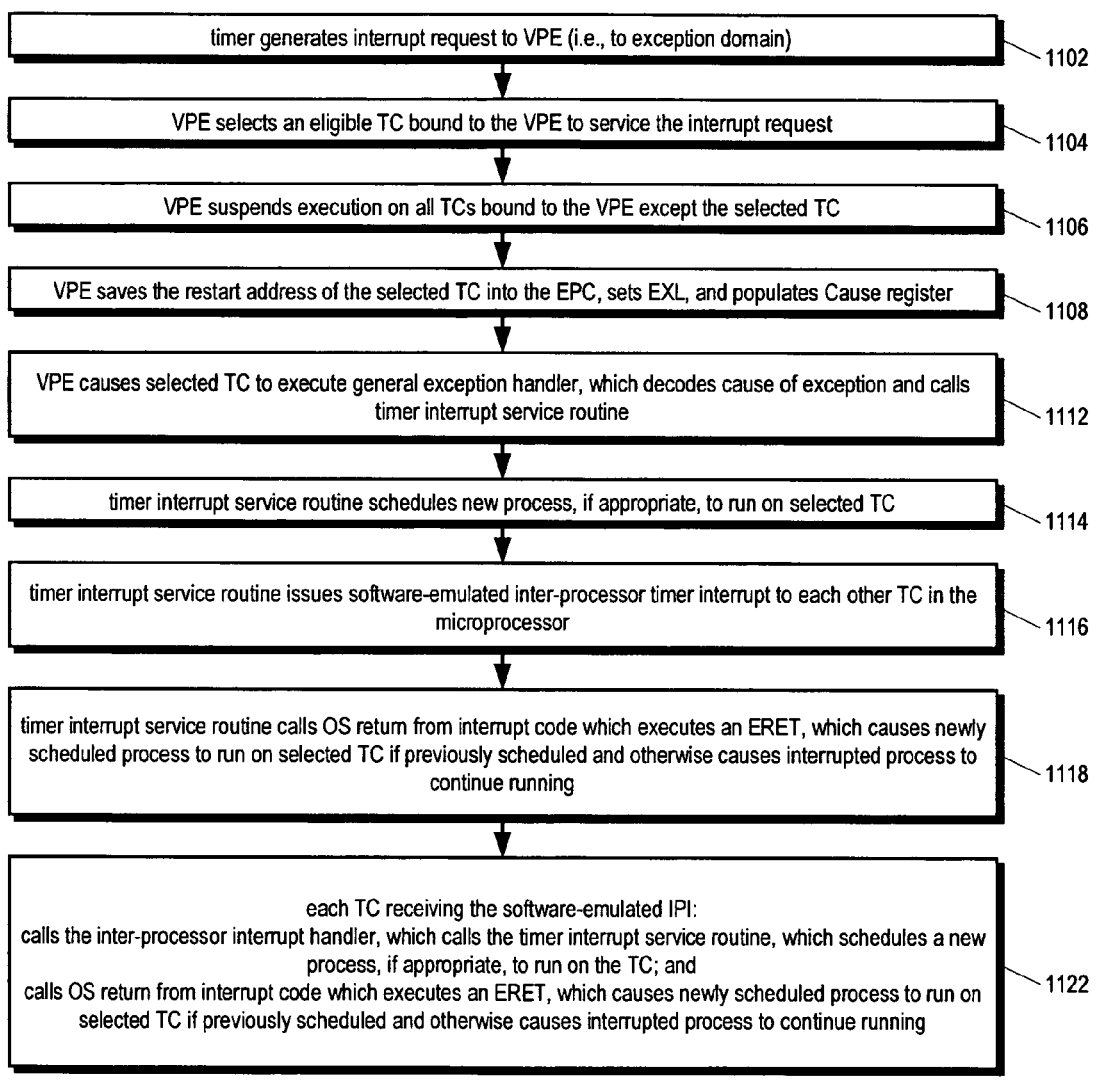
FIG. 11 is a flowchart illustrating a method for performing preemptive process scheduling by a symmetric multiprocessor operating system on the microprocessor of FIG. 1 according to the present invention.

Referring now to FIG. 11, a flowchart illustrating a method for performing preemptive process scheduling by a symmetric multiprocessor operating system (SMP OS), such as Linux SMP, on the microprocessor 100 of FIG. 1 according to the present invention is shown. Symmetric multiprocessor operating systems manage a plurality of processes, or tasks, and assign the execution of the processes to particular processors, or CPUs, of the symmetric multiprocessor system, which are thread contexts 104 in the case of microprocessor 100. Within the set of processes assigned to execute on a given CPU, or thread context 104, the preemptive SMP OS schedules the set of processes to run on the assigned thread context 104 in some time-multiplexed fashion according to the scheduling algorithm of the SMP OS. Flow begins at block 1102.

At block 1102, a timer generates an interrupt request to a VPE 102, which are the exception domains of the microprocessor 100. In one embodiment, the timer interrupt request is an asynchronous hardware interrupt generated by the MIPS PRA Count/Compare register pairs of one of the VPEs 102 of microprocessor 100, and the Count/Compare register pairs of the other VPEs 102 are all disabled. Flow proceeds to block 1104.

At block 1104, the interrupted VPE 102 selects an eligible thread context 104 bound to itself to service the timer interrupt request. As described above, in the MIPS MT ASE, a thread context 104 is eligible if its IXMT bit 518 is clear and the curVPE field 558 of the TCBind Register 556 of FIG. 5K specifies to which VPE 102 the thread context 104 is bound.

In one embodiment, the method for choosing the eligible thread context 104 to service an asynchronous exception is implementation-dependent and may be adapted to satisfy the particular application in which the microprocessor 100 is employed. For example, the VPE 102 may select an eligible thread context 104 in a random fashion. For another example, the VPE 102 may select an eligible thread context 104 in a round-robin order. For another example, the VPE 102 may select a thread context 104 based on the relative priorities of the thread contexts 104, such as selecting the thread context 104 having the lowest relative instruction issue priority, or a lowest relative priority for servicing exceptions. Flow proceeds to block 1106.

At block 1106, the VPE 102 suspends execution of the threads executing on all thread contexts 104 bound to the VPE 102 except for the thread context 104 selected at block 1104. In particular, the VPE 102 ceases to issue instructions to the execution pipeline of the threads. Flow proceeds to block 1108.

At block 1108, the VPE 102 saves the restart address of the selected thread context 104 into the EPC Register 598, sets the EXL bit 576 of the Status Register 571, and populates the MIPS PRA Cause register, all of the VPE's 102 Coprocessor 0 VPE context 106. Flow proceeds to block 1112.

At block 1112, the VPE 102 causes the selected thread context 104 to execute a general exception handler at the general exception vector according to the MIPS PRA. The general exception handler decodes the cause of the exception via the MIPS PRA Cause register and Status Register 571 and determines the exception was an asynchronous hardware interrupt generated by the timer. Consequently, the general exception handler calls the timer interrupt service routine, which among other functions, schedules processes according to the preemptive multitasking algorithm of the operating system. In one embodiment, the timer interrupt routine may call a separate routine dedicated to scheduling processes. Flow proceeds to block 1114.

At block 1114, the timer interrupt service routine determines whether a new process, or task, should be scheduled on the selected thread context 104 according to the SMP OS multitasking scheduling algorithm. If so, the timer interrupt service routine schedules a new process to run on the selected thread context 104; otherwise, the timer interrupt service routine leaves the current process to run on the selected thread context 104. It is noted that a thread and a process herein are not necessarily synonymous. A process is an entity managed by the SMP operating system, and typically comprises entire programs, such as application programs or portions of the operating system itself; whereas a thread is simply a stream of instructions, which of course may be a stream of instructions of an operating system process, or task. Flow proceeds to block 1116.

At block 1116, the timer interrupt service routine issues a software-emulated inter-processor interrupt to each other thread context 104 in the microprocessor 100, according to FIG. 10 and/or the source code listing. In particular, if the target thread context 104 is bound to the same VPE 102 as the selected thread context 104 and the target thread context 104 is not exempted from servicing exceptions (as determined by the IXMT bit 518), then the timer interrupt service routine performs a software-emulated inter-processor interrupt to the target thread context 104 according to FIG. 10; if the target thread context 104 is bound to the same VPE 102 as the selected thread context 104 but the target thread context 104 is exempted from servicing exceptions, then the timer interrupt service routine places the timer interrupt service IPI message on the target thread context's 104 queue at lines 48-62 of the source code; and if the target thread context 104 is bound to a different VPE 102 as the selected thread context 104, then the timer interrupt service routine will place an IPI message on a queue associated with the target thread context 104 and issue a MIPS PRA asynchronous software interrupt to the target VPE 102, i.e., to the VPE 102 to which the target thread context 104 is bound, according to lines 23-28 of the source code, which will cause the queue to be sampled and drained.

At block 1118, the timer interrupt service routine calls the operating system return from interrupt code, which executes an ERET instruction. If a new process was scheduled to run at block 114, then the ERET causes the newly scheduled process to run; otherwise, the ERET causes the process that was interrupted by the timer interrupt request to continue running. Flow proceeds to block 1122.

At block 1122, each thread context 104 that was the target of a software-emulated inter-processor interrupt performed at block 1116 eventually calls the inter-processor interrupt service routine, according to block 1034 of FIG. 10, after performing the other steps of FIG. 10. On each thread context 104, the inter-processor interrupt service routine calls the timer interrupt service routine, which schedules a new process to run on the thread context 104, if appropriate, similar to the manner described above with respect to block 1114. When the inter-processor interrupt handler completes, the operating system return from interrupt code is called, which executes an ERET instruction, according to block 1036 of FIG. 10. If the timer interrupt service routine scheduled a new process to run on the thread context 104, then the newly scheduled process will run on the thread context 104 when the return from interrupt code executes the ERET at block 1036 of FIG. 10, rather than thread B, i.e., rather than the thread that was halted by the software-emulated directed inter-processor interrupt. If so, thread B will eventually be scheduled to run again so that it may complete. If the timer interrupt service routine did not schedule a new process to run on the thread context 104, then thread B will continue running when the ERET is executed. Flow ends at block 1122.

As may be observed from FIG. 11, the software emulation of directed exceptions described according to FIG. 10 enables the SMP OS to treat each thread context as an operating system level CPU, in particular with regard to preemptive process scheduling.

Although the present invention and its objects, features, and advantages have been described in detail, other embodiments are encompassed by the invention. For example, although embodiments have been described in which the state saved by the initiating thread context comprises the restart address, execution privilege level, interrupt enable state, and/or register set contents of the target thread context, in other processor architectures the initiating thread context may save additional thread context state relevant to the particular multithreading processor architecture. Furthermore, although embodiments have been described herein with respect to a MIPS MT ASE processor core, the present invention is not limited to such embodiments; rather any multithreading system that does not provide an architected means of one MP OS processor to direct an IPI to another MP OS processor, but which includes architected instructions that enable one MP OS processor to read and modify the state of the other MP OS processor, may employ the software emulation of directed exceptions invention described herein. Still further, although embodiments have been described herein with respect to the MIPS32® Architecture, the invention is not limited to such embodiments, but may be extended to other architectures, such as the MIPS64® Architecture and non-MIPS architectures. Finally, although embodiments have been described in the context of directed timer interrupts, the present invention may be employed to emulate via software other types of exceptions directed from one thread context to another.

Figure 12:
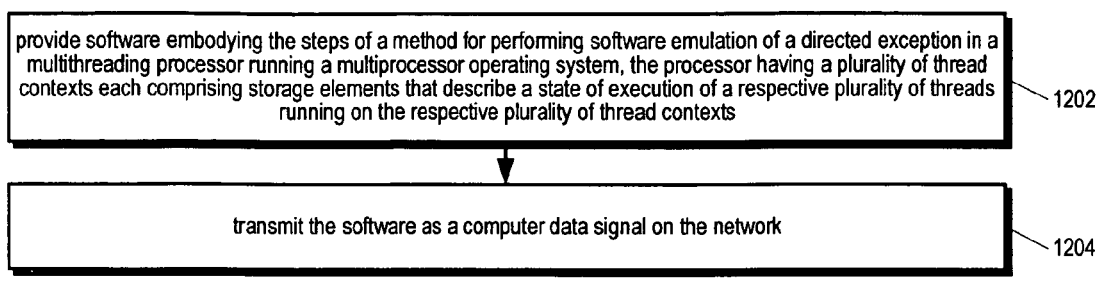
FIG. 12 is a flowchart illustrating a method for providing software for performing the steps of FIG. 10 or portions of the source code listing and subsequently transmitting the software as a computer data signal over a communication network.
Figure 13:
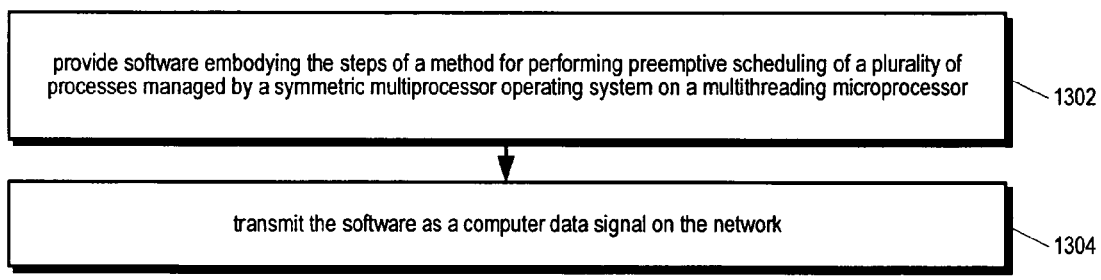
FIG. 13 is a flowchart illustrating a method for providing software for performing the steps of FIG. 11 or portions of the source code listing and subsequently transmitting the software as a computer data signal over a communication network.

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, and so on, or other available programs and databases. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing operating system software described herein by providing the software and subsequently transmitting the software as a computer data signal over a communication network including the Internet and intranets, such as shown in FIGS. 12 and 13. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

```
1    void smtc_send_ipi(int cpu, int type, unsigned int action)
2    {
3          int tcstatus;
4          smtc_ipi *pipi;
5          long flags;
6          int mtflags;
7
8          if(cpu == smp_processor_id( )) {
9                  printk("Cannot Send IPI to self!\n");
10                 return;
11         }
12         /* Set up a descriptor, to be delivered either promptly or queued */
13         pipi = smtc_ipi_dq(&freeIPIq);
14         if(pipi == NULL) {
15                 bust_spinlocks(1);
16                 mips_mt_regdump(dvpe( ));
17                 panic("IPI Msg. Buffers Depleted\n");
18         }
19         pipi->type = type;
20         pipi->arg = (void *)action;
21         pipi->dest = cpu;
22         if(cpu_data[cpu].vpe_id != cpu_data[smp_processor_id( )].vpe_id) {
23                 /* If not on same VPE, enqueue and send cross-VPE interrupt */
24                 smtc_ipi_nq(&IPIQ[cpu], pipi);
25                 LOCK_CORE_PRA( );
26                 settc(cpu_data[cpu].tc_id);
27                 write_vpe_c0_cause(read_vpe_c0_cause( ) | C_SW1);
28                 UNLOCK_CORE_PRA( );
29         } else {
30                 /*
31                  * Not sufficient to do a LOCK_MT_PRA (dmt) here.
32                  * since ASID shootdown on the other VPE may
33                  * collide with this operation.
34                  */
35                 LOCK_CORE_PRA( );
36                 settc(cpu_data[cpu].tc_id);
37                 /* Halt the targeted TC */
38                 write_tc_c0_tchalt(TCHALT_H);
39                 mips_ihb( );
40
41                 /*
42                  * Inspect TCStatus - if IXMT is set, we have to queue
43                  * a message. Otherwise, we set up the "interrupt"
44                  * of the other TC
45                  */
46                 tcstatus = read_tc_c0_tcstatus( );
47
48                 if ((tcstatus & TCSTATUS_IXMT) != 0) {
```

```
49              /*
50               * Spin-waiting here can deadlock,
51               * so we queue the message for the target TC.
52               */
53              write_tc_c0_tchalt(0);
54              UNLOCK_CORE_PRA( );
55              /* Try to reduce redundant timer interrupt messages */
56              if(type == SMTC_CLOCK_TICK) {
57                      if(atomic_postincrement(&ipi_timer_latch[cpu])!=0) {
58                              smtc_ipi_nq(&freeIPIq, pipi);
59                              return;
60                      }
61              }
62              smtc_ipi_nq(&IPIQ[cpu], pipi);
63          } else {
64              post_direct_ipi(cpu, pipi);
65              write_tc_c0_tchalt(0);
66              UNLOCK_CORE_PRA( );
67          }
68      }
69  }
70  /*
71   * Send IPI message to Halted TC, TargTC already having been set
72   */
73  void post_direct_ipi(int cpu, smtc_ipi *pipi)
74  {
75      struct pt_regs *kstack;
76      unsigned long tcstatus;
77      unsigned long tcrestart;
78      extern u32 kernelsp[NR_CPUS];
79      extern void __smtc_ipi_vector(void);
80
81      /* Extract Status, EPC from halted TC */
82      tcstatus = read_tc_c0_tcstatus( );
83      tcrestart = read_tc_c0_tcrestart( );
84      /* If TCRestart indicates a WAIT instruction, advance the PC */
85      if((tcrestart & 0x80000000)
86          && ((*(unsigned int *)tcrestart & 0xfe00003f) == 0x42000020)) {
87              tcrestart += 4;
88      }
89      /*
90       * Save on TC's future kernel stack
91       *
92       * CU bit of Status is indicator that TC was
93       * already running on a kernel stack...
94       */
95      if(tcstatus & ST0_CU0) {
96              /* Note that this "- 1" is pointer arithmetic */
97              kstack = ((struct pt_regs *)read_tc_gpr_sp( )) - 1;
98      } else {
99              kstack = ((struct pt_regs *)kernelsp[cpu]) - 1;
100     }
101
102     kstack->cp0_epc = (long)tcrestart;
103     /* Save TCStatus */
104     kstack->cp0_tcstatus = tcstatus;
105     /* Pass token of operation to be performed kernel stack pad area */
106     kstack->pad0[4] = (unsigned long)pipi;
107     /* Pass address of function to be called likewise */
108     kstack->pad0[5] = (unsigned long)&ipi_decode;
109     /* Set interrupt exempt and kernel mode */
110     tcstatus |= TCSTATUS_IXMT;
111     tcstatus &= ~TCSTATUS_TKSU;
112     write_tc_c0_tcstatus(tcstatus);
113     ehb( );
114     /* Set TC Restart address to be SMTC IPI vector */
115     write_tc_c0_tcrestart(__smtc_ipi_vector);
116 }
117 /*
118  * Assembly Language Function for MIPS MT IPI support
119  */
120
121 /*
122  * "Software Interrupt" linkage.
123  *
124  * This is invoked when an "Interrupt" is sent from one TC to another,
125  * where the TC to be interrupted is halted, has it's Restart address
126  * and Status values saved by the "remote control" thread, then modified
127  * to cause execution to begin here, in kernel mode. This code then
```

-continued

```
128     * disguises the TC state as that of an exception and transfers
129     * control to the general exception or vectored interrupt handler.
130     */
131
132            .set noreorder
133
134     /*
135     1) Set EXL (this is per-VPE, so this can't be done by proxy!)
136     2) Restore the K/CU and IXMT bits to the pre "exception" state
137        (EXL means no interrupts and access to the kernel map).
138     3) Set EPC to be the saved value of TCRestart.
139     4) Jump to the exception handler entry point passed by the sender.
140     */
141
142     /*
143     * Revised vision: Set EXL and restore K/CU/IXMT state of
144     * pre-halt thread, then save everything and call though
145     * some function pointer to imaginary_exception, which
146     * will parse a register value or memory message queue to
147     * deliver things like interprocessor interrupts. On return
148     * from that function, jump to the global ret_from_irq code
149     * to invoke the scheduler and return as appropriate.
150     */
151
152     #define PT_PADSLOT4 (PT_R0-8)
153     #define PT_PADSLOT5 (PT_R0-4)
154
155            .text
156            .align 5
157     FEXPORT(___smtc_ipi_vector)
158            .set    noat
159            /* Disable thread scheduling to make Status update atomic */
160            dmt     k1
161            ehb
162            /* Set EXL */
163            mfc0    k0,CP0_STATUS
164            ori     k0,k0,ST0_EXL
165            mtc0    k0,CP0_STATUS
166            ehb
167            /* Thread scheduling now inhibited by EXL. Restore TE state. */
168            andi    k1,k1,VPECONTROL_TE
169            beqz    k1,1f
170            emt
171     1:
172            /*
173             * The IPI sender has put some information on the anticipated
174             * kernel stack frame. If we were in user mode, this will be
175             * built above the saved kernel SP. If we were already in the
176             * kernel, it will be built above the current CPU SP.
177             *
178             * Were we in kernel mode, as indicated by CU0?
179             */
180            sll     k1,k0,3
181            .set noreorder
182            bltz    k1,2f
183            move    k1,sp
184            .set reorder
185            /*
186             * If previously in user mode, set CU0 and use kernel stack.
187             */
188            li      k1,ST0_CU0
189            or      k1,k1,k0
190            mtc0    k1,CP0_STATUS
191            ehb
192            get_saved_sp
193            /* Interrupting TC will have pre-set values in slots in the new frame */
194     2:     subu    k1,k1,PT_SIZE
195            /* Load TCStatus Value */
196            lw      k0,PT_TCSTATUS(k1)
197            /* Write it to TCStatus to restore CU/KSU/IXMT state */
198            mtc0    k0,$2,1
199            ehb
200            lw      k0,PT_EPC(k1)
201            mtc0    k0,CP0_EPC
202            /* SAVE_ALL macro will redundantly recompute the SP, but use for now */
203            SAVE_ALL
204            CLI
205            move    a0,sp
206            /* Function to be invoked passed stack pad slot 5 */
```

-continued

```
207         lw      t0,PT_PADSLOT5(sp)
208         /* Argument from sender passed in stack pad slot 4 */
209         lw      a1,PT_PADSLOT4(sp)
210         jalr    t0
211         nop
212         j       ret_from_irq
213         nop
214
215     /*
216      * Move to kernel mode and disable interrupts.
217      * Set cp0 enable bit as sign that we're running on the kernel stack
218      */
219             .macro   CLI
220     #if !defined(CONFIG_MIPS_MT_SMTC)
221             mfc0    t0, CP0_STATUS
222             li      t1, ST0_CU0 | 0x1f
223             or      t0, t1
224             xori    t0, 0x1f
225             mtc0    t0, CP0_STATUS
226     #else /* CONFIG_MIPS_MT_SMTC */
227             /*
228              * For SMTC, we need to set privilege
229              * and disable interrupts only for the
230              * current TC, using the TCStatus register.
231              */
232             .set     mips32
233             mfc0    t0,CP0_TCSTATUS
234             /* Fortunately CU 0 is in the same place in both registers */
235             /* Set TCU0, TMX, TKSU (for later inversion) and IXMT */
236             li      t1, ST0_CU0 | 0x08001c00
237             or      t0,t1
238             /* Clear TKSU, leave IXMT */
239             xori    t0, 0x00001800
240             mtc0    t0, CP0_TCSTATUS
241             ehb
242             .set     mips0
243             /* We need to leave the global IE bit set, but clear EXL...*/
244             mfc0    t0, CP0_STATUS
245             ori     t0, ST0_EXL | ST0_ERL
246             xori    t0, ST0_EXL | ST0_ERL
247             mtc0    t0, CP0_STATUS
248     #endif /* CONFIG_MIPS_MT_SMTC */
249             irq_disable_hazard
250             .endm
```

I claim:

1. A method for performing software emulation of a directed exception in a multithreading processor running a multiprocessor operating system, the processor having a plurality of thread contexts each comprising storage elements that describe a state of execution of a respective plurality of threads running on the respective plurality of thread contexts, the method comprising:
    writing, by a first thread running on a first thread context, to a second thread context to cause a second thread running on the second thread context to stop running;
    writing, by the first thread, to the second thread context an address of an exception handler of the operating system; and
    writing, by the first thread, to the second thread context to cause the exception handler to commence running at the address on the second thread context.

2. The method as recited in claim 1, further comprising:
    processing, by the exception handler, an inter-processor interrupt message, after said writing to cause the exception handler to commence running.

3. The method as recited in claim 2, further comprising:
    writing, by the first thread, the inter-processor interrupt message to a memory coupled to the multithreading processor, prior to said writing to cause the exception handler to commence running.

4. The method as recited in claim 2, further comprising:
    saving, by the exception handler, general purpose registers of the second thread context to a memory coupled to the multithreading processor, prior to said processing the inter-processor interrupt message.

5. The method as recited in claim 2, further comprising:
    setting, by the exception handler, an execution privilege level of the second thread context to the operating system privilege level, prior to said processing the inter-processor interrupt message.

6. The method as recited in claim 2, further comprising:
    disabling, by the exception handler, interrupts from being serviced by the second thread context, prior to said processing the inter-processor interrupt message.

7. The method as recited in claim 1, further comprising:
    writing, by the first thread, to the second thread context to set an execution privilege level of the exception handler to the operating system privilege level, prior to said writing to cause the exception handler to commence running.

8. The method as recited in claim 1, further comprising:
    writing, by the first thread, to the second thread context to disable interrupts from being serviced by the second thread context, prior to said writing to cause the exception handler to commence running.

9. The method as recited in claim 1, further comprising:
reading, by the first thread, from the second thread context a restart address of the second thread.

10. The method as recited in claim 9, wherein the restart address is an address of an instruction of the second thread at which the second thread recommences running on the second thread context after the exception handler returns.

11. The method as recited in claim 9, wherein said restart address is an address of an instruction of the second thread interrupted by said writing to cause the second thread to stop running.

12. The method as recited in claim 9, wherein said restart address is an address of a branch instruction immediately preceding an instruction of the second thread interrupted by said writing to cause the second thread to stop running, if the interrupted instruction is in a branch delay slot of the branch instruction.

13. The method as recited in claim 9, further comprising:
writing, by the first thread, the restart address to a memory coupled to the multithreading processor.

14. The method as recited in claim 13, wherein said writing the restart address to a memory comprises:
writing, by the first thread, the restart address to a stack frame in the memory allocated by the first thread for the exception handler.

15. The method as recited in claim 9, further comprising:
returning to the restart address, after the exception handler completes.

16. The method as recited in claim 15, further comprising:
reading, by the exception handler, the restart address from the memory, after said writing to cause the exception handler to commence running; and
writing, by the exception handler, the restart address to a MIPS Privileged Resource Architecture (PRA) Coprocessor 0 Exception Program Counter (EPC) register of a MIPS Multithreading Application-Specific Extension Virtual Processing Element (VPE) comprising the second thread context, prior to said returning to the restart address.

17. The method as recited in claim 16, wherein the VPE comprises at least the first and second thread contexts.

18. The method as recited in claim 17, wherein the VPE comprises an exception domain for the first and second thread contexts.

19. The method as recited in claim 17, wherein the VPE comprises one or more interrupt requests, wherein the one or more interrupt requests are non-directable specifically to one of the first and second thread contexts.

20. The method as recited in claim 19, wherein the one or more interrupt requests comprise one or more hardware interrupt inputs.

21. The method as recited in claim 19, wherein the one or more interrupt requests comprise one or more software interrupt requests.

22. The method as recited in claim 17, wherein the VPE comprises one or more interrupt requests, wherein the one or more interrupt requests are shared by the first and second thread contexts.

23. The method as recited in claim 22, wherein the VPE is configured to select one of the first and second thread contexts to handle one of the interrupt requests during a first instance and to select the other of the first and second thread contexts to handle another of the interrupt requests during a second instance.

24. The method as recited in claim 17, wherein the VPE comprises one or more interrupt requests, wherein the one or more interrupt requests are independent of a number of the first and second thread contexts and other of the plurality of thread contexts of the multithreading processor comprised in the VPE.

25. The method as recited in claim 1, further comprising:
setting, by the exception handler, a MIPS Privileged Resource Architecture (PRA) Coprocessor 0 Status register EXL flag, after said writing to cause the exception handler to commence running.

26. The method as recited in claim 25, wherein the Coprocessor 0 Status register EXL flag being set causes a MIPS Multithreading Application-Specific Extension (MT ASE) Virtual Processing Element (VPE) comprising the first and second thread contexts to have the operating system execution privilege level and to have interrupts disabled.

27. The method as recited in claim 25, further comprising:
reading, by the first thread, a MT ASE TCStatus register of the second thread context, prior to said writing to cause the exception handler to commence running; and
restoring, by the exception handler, the TCStatus register of the second thread context, after said setting the EXL flag.

28. The method as recited in claim 27, further comprising:
setting, by the exception handler, an interrupt exempt (IXMT) bit of the TCStatus register of the second thread context, after said restoring the TCStatus register of the second thread context.

29. The method as recited in claim 27, further comprising:
setting, by the exception handler, to kernel mode a thread kernel/supervisor/user (TKSU) state field of the TCStatus register of the second thread context, after said restoring the TCStatus register of the second thread context.

30. The method as recited in claim 1, further comprising:
reading, by the first thread, from the second thread context an execution privilege level of the second thread, after said writing to cause the second thread context to stop running.

31. The method as recited in claim 30, wherein said reading the execution privilege level of the second thread comprises the first thread executing an instruction of an architected instruction set of the multithreading processor.

32. The method as recited in claim 31, wherein the architected instruction comprises a MIPS Multithreading Application-Specific Extension (MT ASE) MFTR instruction.

33. The method as recited in claim 30, further comprising:
writing, by the first thread, the execution privilege level of the second thread, to a memory coupled to the multithreading processor, after said reading the execution privilege level.

34. The method as recited in claim 33, further comprising:
restoring the execution privilege level from the memory, upon completion of the exception handler and return to running the second thread on the second thread context.

35. The method as recited in claim 1, wherein said writing the address of the exception handler comprises the first thread executing an instruction of an architected instruction set of the multithreading processor.

36. The method as recited in claim 35, wherein the architected instruction comprises a MIPS Multithreading Application-Specific Extension (MT ASE) MTTR instruction.

37. The method as recited in claim 35, wherein said architected instruction is only executable at the operating system execution privilege level.

38. The method as recited in claim 1, wherein the exception handler is configured to handle an architected exception of the multithreading processor.

39. A multiprocessor computer system, comprising:
a microprocessor, comprising at least first and second thread contexts, each comprising:
a restart register; and
a control register, for controlling whether said thread context is halted from execution;
a memory, coupled to said microprocessor, for storing a first thread of execution for execution on said first thread context; and
a multiprocessing operating system (MP OS), stored in said memory, comprising a second thread of execution for execution on said second thread context configured:
to write to said control register of said first thread context to halt execution of said first thread;
to write to said restart register of said first thread context an address of an exception handler of said MP OS; and
to write to said control register of said first thread context to commence execution of said exception handler on said first thread context at said address.

40. The system as recited in claim 39, wherein said first thread comprises a user thread executing on said first thread context at a user execution privilege level.

41. The system as recited in claim 39, wherein said MP OS comprises said first thread, and said first thread executes on said first thread context at an execution privilege level of said MP OS.

42. The system as recited in claim 39, wherein said MP OS is configured to program each of said at least first and second thread contexts as a separate processor of the multiprocessor system.

43. The system as recited in claim 39, wherein each of said at least first and second thread contexts further comprises:
a status register, for storing an execution privilege level of said thread.

44. The system as recited in claim 43, wherein said second thread is further configured:
to write to said status register of said second thread context for setting said second thread context to an execution privilege level of said MP OS, after writing to said control register of said first thread context to halt execution of said first thread, and prior to writing to said control register of said first thread context to commence execution of said exception handler.

45. The system as recited in claim 44, wherein said second thread is further configured:
to read contents of said status register of said second thread context, after writing to said control register of said first thread context to halt execution of said first thread; and
to write said contents to said memory, prior to writing to said control register of said first thread context to commence execution of said exception handler.

46. The system as recited in claim 45, wherein said second thread executing on said second thread context reads said contents of said status register of said first thread context via an instruction included in an instruction set architecture of said microprocessor.

47. The system as recited in claim 46, wherein said instruction included in said instruction set architecture of said microprocessor comprises a MIPS instruction set architecture (ISA) MFTR instruction.

48. The system as recited in claim 39, wherein each of said at least first and second thread contexts further comprises:
a status register, for storing an interrupt exemption control indicator of said thread.

49. The system as recited in claim 48, wherein said second thread is further configured:
to write to said status register of said second thread context for exempting said second thread context from servicing interrupts, after writing to said control register of said first thread context to halt execution of said first thread, and prior to writing to said control register of said first thread context to commence execution of said exception handler.

50. The system as recited in claim 39, wherein said second thread executing on said second thread context writes to said first thread context via an instruction included in an instruction set architecture of said microprocessor.

51. The system as recited in claim 50, wherein said instruction included in said instruction set architecture of said microprocessor comprises a MIPS instruction set architecture (ISA) MTTR instruction.

52. The system as recited in claim 39, wherein said microprocessor further comprises:
an input, for indicating a request to interrupt execution by the microprocessor and to service said request, wherein said request is non-specific about which of said at least first and second thread contexts is to be interrupted and is to service said request.

53. The system as recited in claim 52, wherein said microprocessor is configured to select one of said at least first and second thread contexts to be interrupted and to service said request, wherein said microprocessor does not select a same one of said at least first and second thread contexts to be interrupted and to service said request every time said request is indicated on said input.

54. The system as recited in claim 53, wherein said microprocessor is configured to suspend execution of all but said one of said at least first and second thread contexts selected to service said interrupt request.

55. The system as recited in claim 54, wherein said one of said at least first and second thread contexts selected to service said interrupt request is configured:
to write to said control register of a non-selected one of said at least first and second thread contexts to halt execution thereof;
to write to said restart register of said non-selected one of said at least first and second thread contexts said address of said exception handler of said MP OS; and
to write to said control register of said non-selected one of said at least first and second thread contexts to commence execution of said exception handler on said non-selected one of said at least first and second thread contexts at said address.

56. The system as recited in claim 39, wherein said microprocessor further comprises:
a plurality of thread contexts, in addition to said at least first and second thread contexts;
a plurality of virtual processing elements (VPEs), wherein a first of said plurality of VPEs comprises said at least first and second thread contexts, and wherein each of the other of said plurality of VPEs comprises a mutually exclusive set of at least one of said plurality of thread contexts;
an input, for indicating a request specifying, from among said plurality of VPEs, said one of said plurality of VPEs comprising said at least first and second thread contexts to interrupt execution thereof and to service said request, rather than specifying one of said at least first and second thread contexts to interrupt execution thereof and to service said interrupt request.

57. The system as recited in claim 56, wherein said first VPE is configured to select one of said at least first and second thread contexts to interrupt execution thereof and to service said request, wherein said first VPE does not select a same one of said at least first and second thread contexts to interrupt execution thereof and to service said request every time said request is indicated on said input.

58. The system as recited in claim 57, wherein each of said VPEs further comprises:
an exception program counter register, for storing an address of an instruction to which said VPE transfers control in response to execution of a return from exception instruction.

59. The system as recited in claim 58, wherein said second thread is configured:
to read a restart address from said restart register of said first thread context, after writing to said control register of said first thread context to halt execution of said first thread; and
to write said restart address to said memory.

60. The system as recited in claim 59, wherein said exception handler is configured: to read said restart address from said memory; and to write said restart address to said exception program counter.

61. The system as recited in claim 57, wherein each of said VPEs further comprises:
a status register, for storing an exception level indicator indicating whether said VPE is currently servicing an exception.

62. The system as recited in claim 61, wherein said exception handler is configured:
to write said status register to indicate said exception level indicator to indicate said VPE is currently servicing an exception.

63. The system as recited in claim 39, wherein said second thread is configured:
to read contents of said restart register of said first thread context, after writing to said control register of said first thread context to halt execution of said first thread; and
to write said contents to said memory.

64. The system as recited in claim 39, wherein each of said at least first and second thread contexts further comprises:
a set of general purpose registers;
wherein said exception handler is further configured:
to read contents of said general purpose registers; and
to write said contents to said memory.

65. A computer program product for use with a computing device, the computer program product comprising:
a computer-readable storage medium, having computer readable program code embodied in said medium, for causing a method for performing software emulation of a directed exception in a multithreading processor running a multiprocessor operating system, the processor having a plurality of thread contexts each comprising storage elements that describe a state of execution of a respective plurality of threads running on the respective plurality of thread contexts, said computer readable program code comprising:
first program code for providing a step of writing, by a first thread running on a first thread context, to a second thread context to cause a second thread running on the second thread context to stop running;
second program code for providing a step of writing, by the first thread, to the second thread context an address of an exception handler of the operating system; and
third program code for providing a step of writing, by the first thread, to the second thread context to cause the exception handler to commence running at the address on the second thread context.

66. The computer program product of claim 65, wherein said computer readable program code further comprises:
fourth program code for providing a step of writing, by the first thread, to the second thread context to set an execution privilege level of the exception handler to the operating system privilege level, prior to said writing to cause the exception handler to commence running.

67. The computer program product of claim 65, wherein said computer readable program code further comprises:
fourth program code for providing a step of writing, by the first thread, to the second thread context to disable interrupts from being serviced by the second thread context, prior to said writing to cause the exception handler to commence running.

68. A method for providing operating system software for performing emulation of a directed exception in a multithreading processor running a multiprocessor operating system, the processor having a plurality of thread contexts each comprising storage elements that describe a state of execution of a respective plurality of threads running on the respective plurality of thread contexts, the method comprising:
providing, with a processor-based system, computer-readable program code describing the operating system software, the program code comprising:
first program code for providing a step of writing, by a first thread running on a first thread context, to a second thread context to cause a second thread running on the second thread context to stop running;
second program code for providing a step of writing, by the first thread, to the second thread context an address of an exception handler of the operating system; and
third program code for providing a step of writing, by the first thread, to the second thread context to cause the exception handler to commence running at the address on the second thread context; and
transmitting the computer-readable program code as a computer data signal on a network.

* * * * *